United States Patent
Alpert et al.

(10) Patent No.: US 11,510,098 B2
(45) Date of Patent: Nov. 22, 2022

(54) DETERMINING A NUMBER OF SPATIAL STREAMS AND A BANDWIDTH

(71) Applicants: Intel Corporation, Santa Clara, CA (US); Yaron Alpert, Hod Hasharoni (IL); Laurent Cariou, Portland, OR (US); Po-Kai Huang, San Jose, CA (US); Xiaogang Chen, Hillsboro, OR (US); Arik Klein, Givaat Shmuel (IL); Danny Ben-Ari, Hasharon Hatichon (IL); Robert J. Stacey, Portland, OR (US)

(72) Inventors: Yaron Alpert, Hod Hasharoni (IL); Laurent Cariou, Portland, OR (US); Po-Kai Huang, San Jose, CA (US); Xiaogang Chen, Hillsboro, OR (US); Arik Klein, Givaat Shmuel (IL); Danny Ben-Ari, Hasharon Hatichon (IL); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 16/630,113

(22) PCT Filed: Jun. 27, 2018

(86) PCT No.: PCT/US2018/039848
§ 371 (c)(1),
(2) Date: Jan. 10, 2020

(87) PCT Pub. No.: WO2019/032216
PCT Pub. Date: Feb. 14, 2019

(65) Prior Publication Data
US 2020/0162963 A1    May 21, 2020

Related U.S. Application Data

(60) Provisional application No. 62/544,506, filed on Aug. 11, 2017, provisional application No. 62/643,480, filed on Mar. 15, 2018.

(51) Int. Cl.
*H04W 28/06*     (2009.01)
*H04L 1/00*      (2006.01)
*H04W 84/12*     (2009.01)

(52) U.S. Cl.
CPC .......... *H04W 28/06* (2013.01); *H04L 1/0025* (2013.01); *H04W 84/12* (2013.01)

(58) Field of Classification Search
CPC ....... H04L 1/0025; H04L 1/06; H04L 1/0003; H04W 28/06; H04W 84/12; H04W 88/08
See application file for complete search history.

(56) References Cited

U.S. PATENT DOCUMENTS

| | | | |
|---|---|---|---|
| 2016/0050659 A1* | 2/2016 | Seok | H04L 1/1671 370/338 |
| 2017/0019306 A1 | 1/2017 | Van et al. | |
| 2017/0127269 A1 | 5/2017 | Ryu et al. | |

OTHER PUBLICATIONS

"International Application Serial No. PCT/US2018/039848, International Preliminary Report on Patentability dated Feb. 20, 2020", 10 pgs.

(Continued)

*Primary Examiner* — Mansour Oveissi
(74) *Attorney, Agent, or Firm* — Schwegman Lundberg & Woessner, P.A.

(57) ABSTRACT

Methods, computer readable media, and apparatus for determining a receive (Rx) number of spatial streams (NSS) for different bandwidths (BWs) and modulation and control schemes (MCSs) are disclosed. An apparatus is disclosed comprising processing circuitry configured to decode a supported HE-MCS and a NSS set field, the supported (Continued)

HE-MSC and NSS set field received from an high-efficiency (HE) station. The processing circuitry may be further configured to determine a first maximum value of N receive (Rx) SS for a MCS and a bandwidth (BW), where the first maximum value of N Rx SS is equal to a largest number of Rx SS that supports the MCS for the BW as indicated by the supported HE-MCS and NSS set field; and, determine additional maximum values based on an operating mode (OM) notification frame, and a value of an OM control (OMC) field. Signaling for BW in 6 GHz is disclosed.

16 Claims, 17 Drawing Sheets

(56) References Cited

OTHER PUBLICATIONS

"International Application Serial No. PCT/US2018/039848, International Search Report dated Oct. 25, 2018", 3 pgs.
"International Application Serial No. PCT/US2018/039848, Written Opinion dated Oct. 25, 2018", 8 pgs.
Broadcom, "CR 27.9 Spatial Reuse Updates", doc.: IEEE802.11-17/0633r2, (May 9, 2017).
Liwen, Chu, "Comment Resolution OMI and Operating Mode", doc.: IEEE802.11-17/1067r2,, (Jul. 27, 2017).
Newracom, "LB225 CR Sub-clause 27.16.1", doc.: IEEE802.11-17/0533rl,, (Apr. 21, 2017).

* cited by examiner

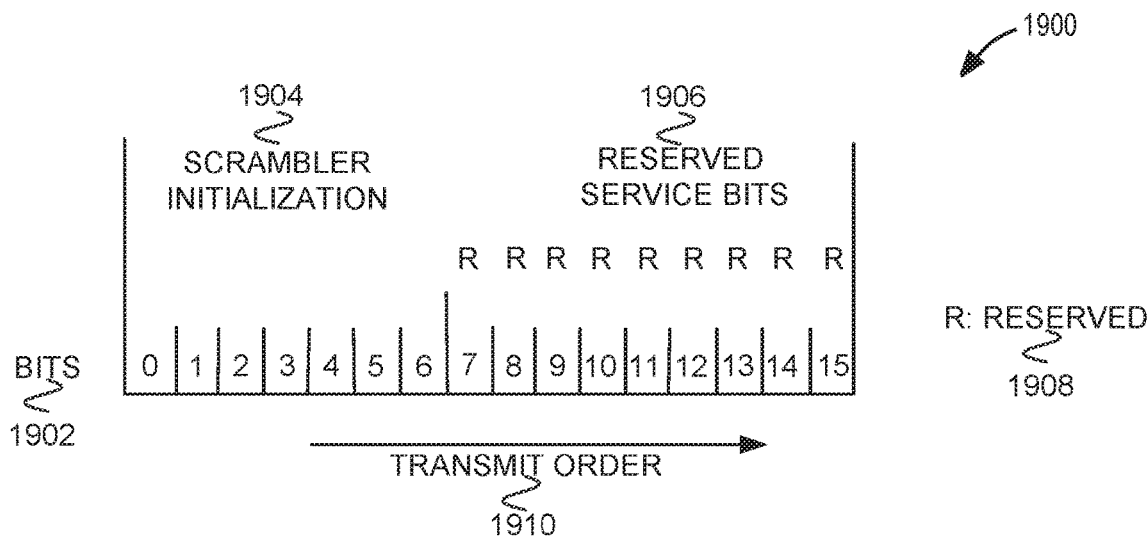

FIG. 19

| PAR-AMETER | CONDITION | FIRST 7 BITS OF SCRAMBLING SEQUENCE ||||
|---|---|---|---|---|---|
| | | B0　　　　　B3 | B4 | B5 | B6 |
| | | TRANSMIT ORDER → ||||
| TXVECTOR | CH_BANDWIDTH_IN_NON_HT IS PRESENT AND DYN_BANDWIDTH_IN_NOT_HT IS NOT PRESENT IN TXVECTOR | 5-BIT PSEUDORANDOM NONZERO INTEGER IF CH_BANDWIDTH_IN_NON_HT EQUALS CBW20 AND A 5-BIT PSEUDORANDOM INTEGER OTHERWISE ||  DYN_BANDWIDTH_IN_NON_HT ||
| TXVECTOR | CH_BANDWIDTH_IN_NON_HT IS PRESENT AND DYN_BANDWIDTH_IN_NOT_HT IS PRESENT IN TXVECTOR | 4-BIT PSEUDO-RANDOM NONZERO INTEGER IF CH_BANDWIDTH_IN_NON_HT EQUALS CBW20 AND DYN_BANDWIDTH_IN_NON_HT EQUALS STATIC, AND A 4-BIT PSEUDORANDOM INTEGER OTHERWISE | DYN_BANDWIDTH_IN_NON_HT | | CBWINNONHTTEMP IS SET TO THIS SUBFIELD OF FIRST 7 BITS OF SCRAMBLING SEQUENCE; THEN CBWINNONHTTEMP IS MAPPED ACCORDING TO FIG. 21 TO CH_BANDWIDTH_IN_NON_HT |
| RXVECTOR | CH_BANDWIDTH_IN_NON_HT IS PRESENT AND DYN_BANDWIDTH_IN_NOT_HT IS PRESENT IN TXVECTOR | --- | DYN_BANDWIDTH_IN_NON_HT | | |

FIG. 20

| CBWINNONHTTEMP | DOT11CURRENTCHANNEL CENTERFREQUNCYINDEX1 | RXVECTOR PARAMETER CH_BANDWIDTH_IN_NON-HT |
|---|---|---|
| 0 | 0 | CBW20 |
| 1 | 0 | CBW40 |
| 2 | 0 | CBW80 |
| 3 | 0 | CBW160 |
| 3 | 1 TO 200 | CBW80+80 |

FIG. 21

| ENUMERATED VALUE | VALUE |
|---|---|
| CBW20 | 0 |
| CBW40 | 1 |
| CBW80 | 2 |
| CBW160/CBW80+80 | 3 |

FIG. 22

DETERMINING A NUMBER OF SPATIAL STREAMS AND A BANDWIDTH

PRIORITY CLAIM

This application is a U.S. National Stage Filing under 35 U.S.C. 371 from International Application No. PCT/US2018/039848, filed Jun. 27, 2018 and published in English as WO 2019/032216 on Feb. 14, 2019, which claims the benefit of priority to U.S. Provisional Patent Application Ser. No. 62/544,506, filed Aug. 11, 2017, and U.S. Provisional Patent Application Ser. No. 62/643,480, filed Mar. 15, 2018, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax and/or IEEE 802.11 next generation. Some embodiments relate to methods, computer readable media, and apparatus for determining a receive (Rx) number of spatial streams (NSS) for different bandwidths (BWs) and modulation and control schemes (MCSs). Some embodiments relate to methods, computer readable media, and apparatus for encoding and determining a bandwidth.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 19 illustrates a service field bit assignment in accordance with some embodiments;

FIG. 20 illustrates contents of the first seven bits of the scrambling sequence in accordance with some embodiments;

FIG. 21 illustrates RXVECTOR parameter CH_BANDWIDTH_IN_NON_HT values in accordance with some embodiments;

FIG. 22 illustrates TXVECTOR parameter CH_BANDWIDTH_IN_NON_HT values in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
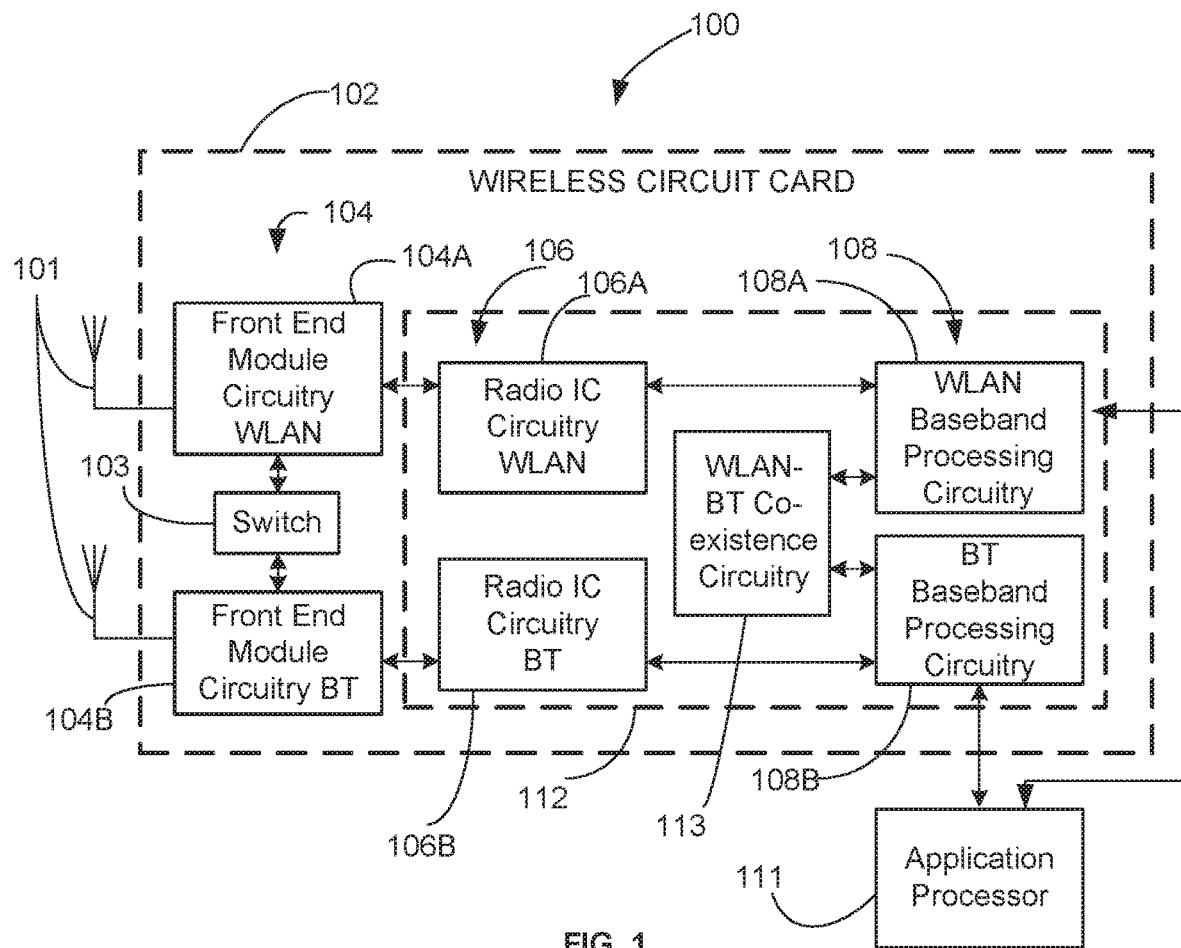
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may) include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11 ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE. LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
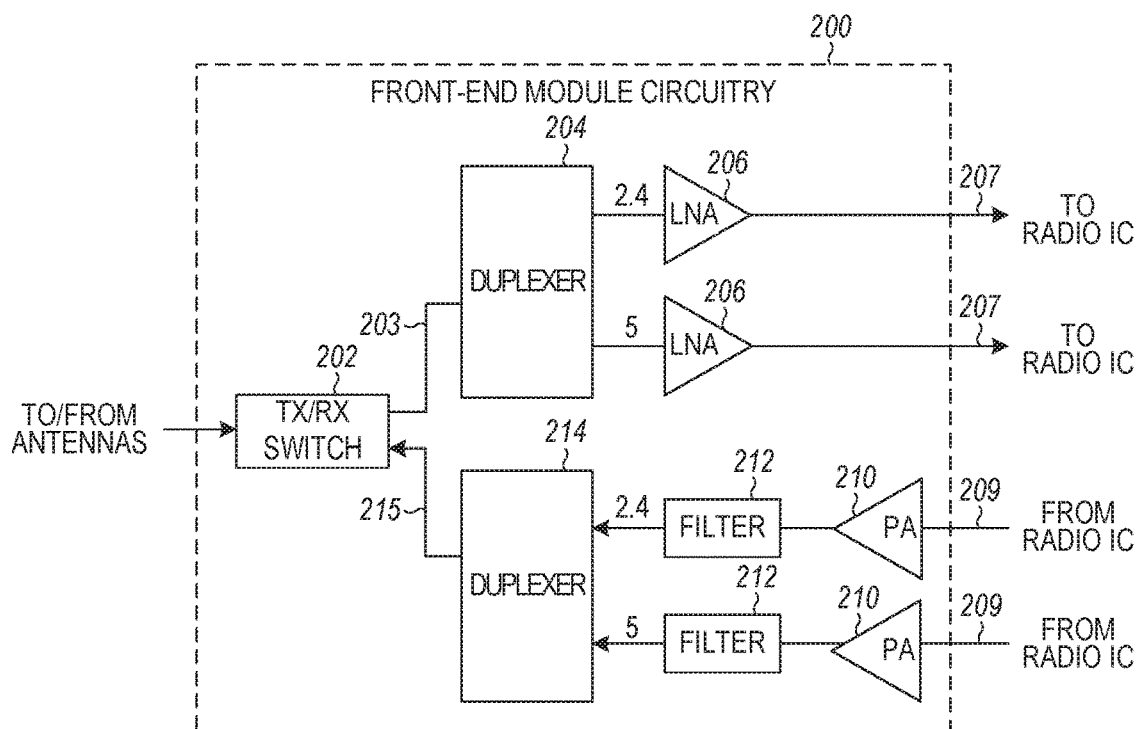
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
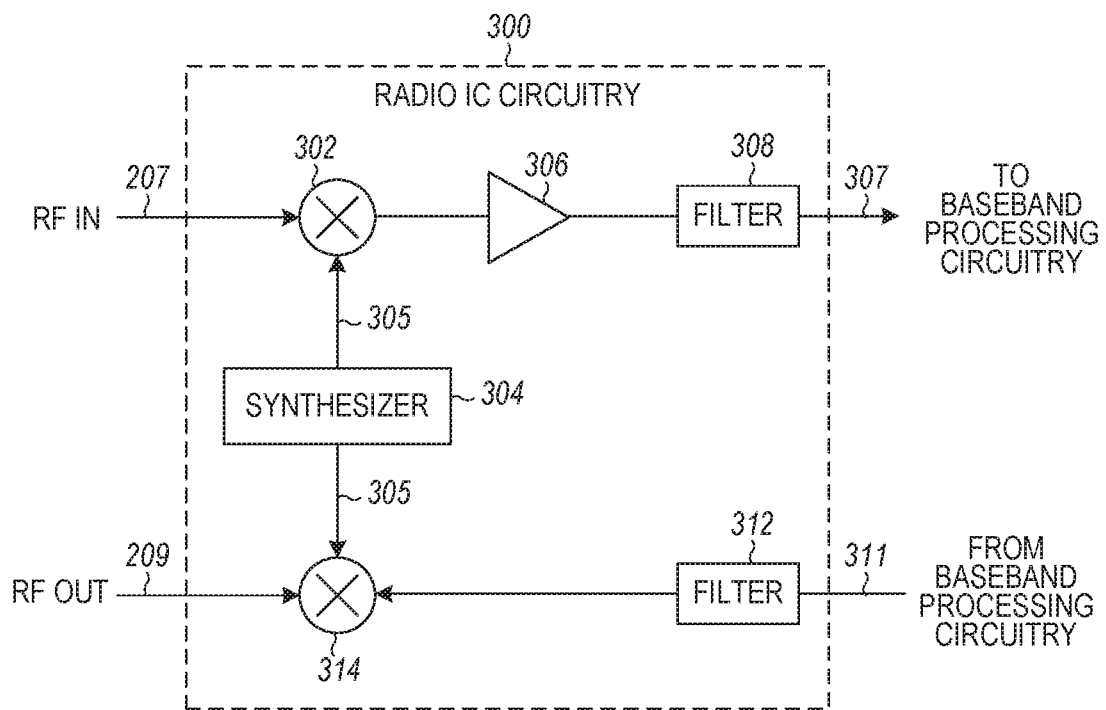
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
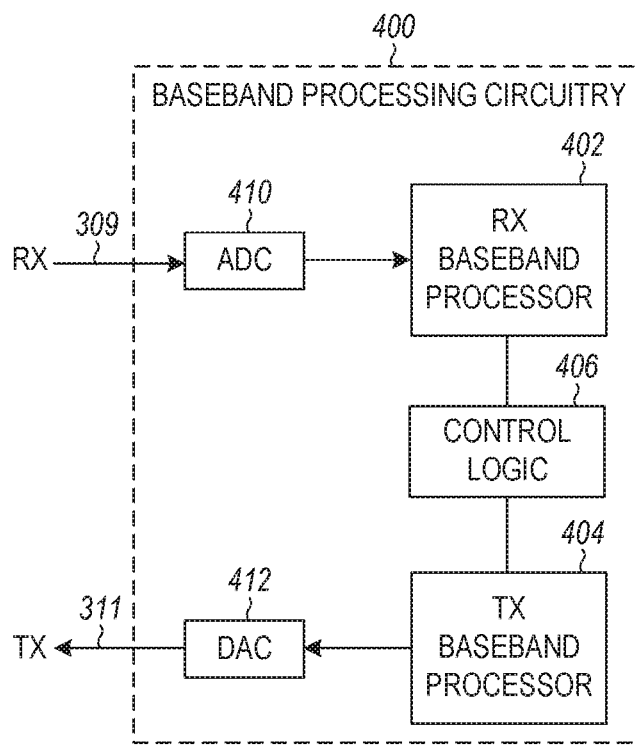
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
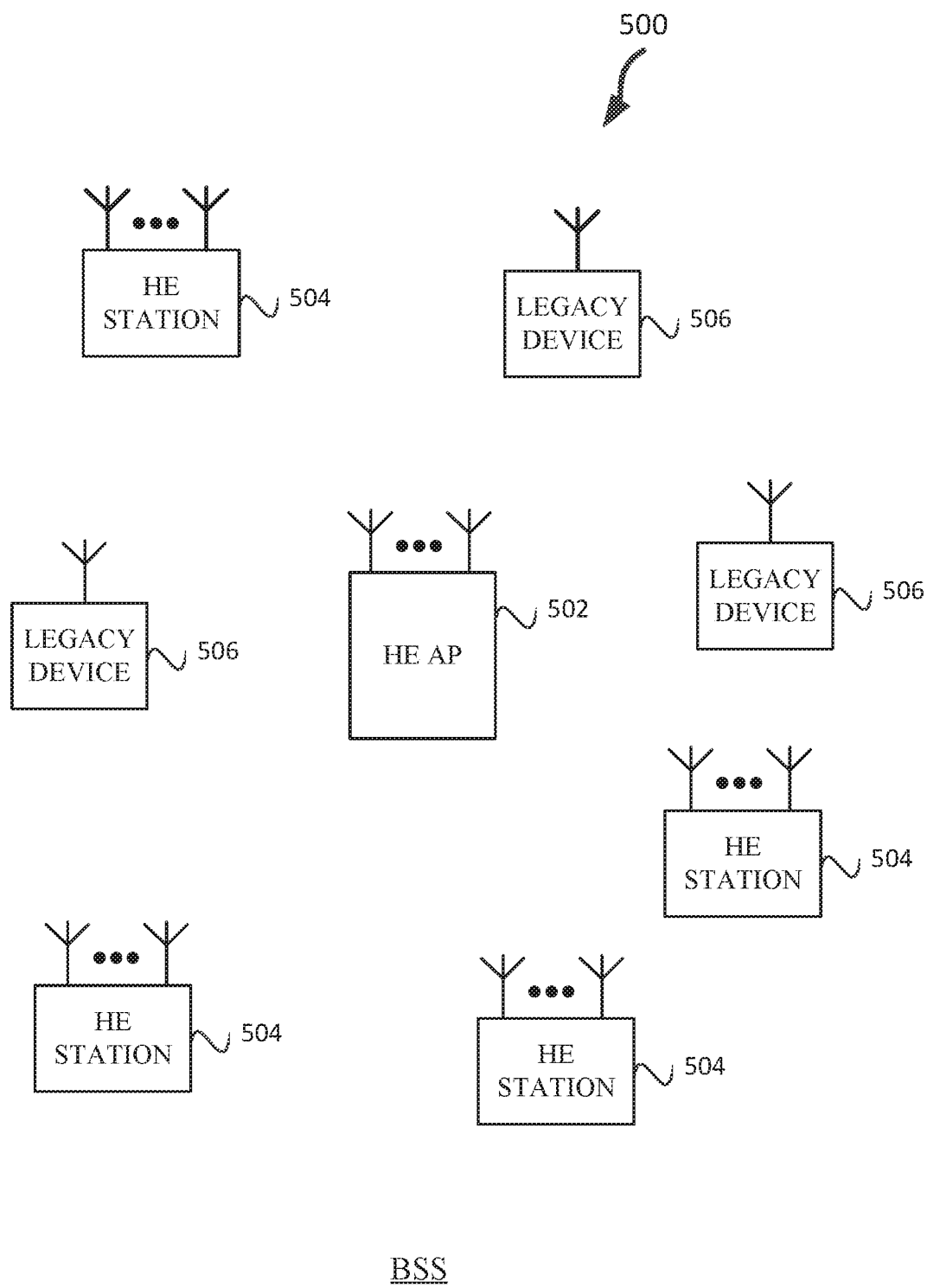
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of HE (e.g., IEEE 802.11ax) stations (STAs) 504, and a plurality of legacy (e.g., IEEE 802.11n/ac) devices 506. In some embodiments, the HE STAs 504 are configured to operate in accordance with extremely-high throughput (EHT), e.g., IEEE 802.11 EHT. In some embodiments, the HE APs 502 are configured to operate in accordance with extremely-high throughput (EHT), e.g., IEEE 802.11 EHT.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11 ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 IX. CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-25.

In example embodiments, the HE station 504 and/or the HE AP 502 are configured to perform the methods and operations/functions described herein in conjunction with FIGS. 1-25. In example embodiments, an apparatus of the HE station 504 and/or an apparatus of the HE AP 502 are configured to perform the methods and functions described herein in conjunction with FIGS. 1-25. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
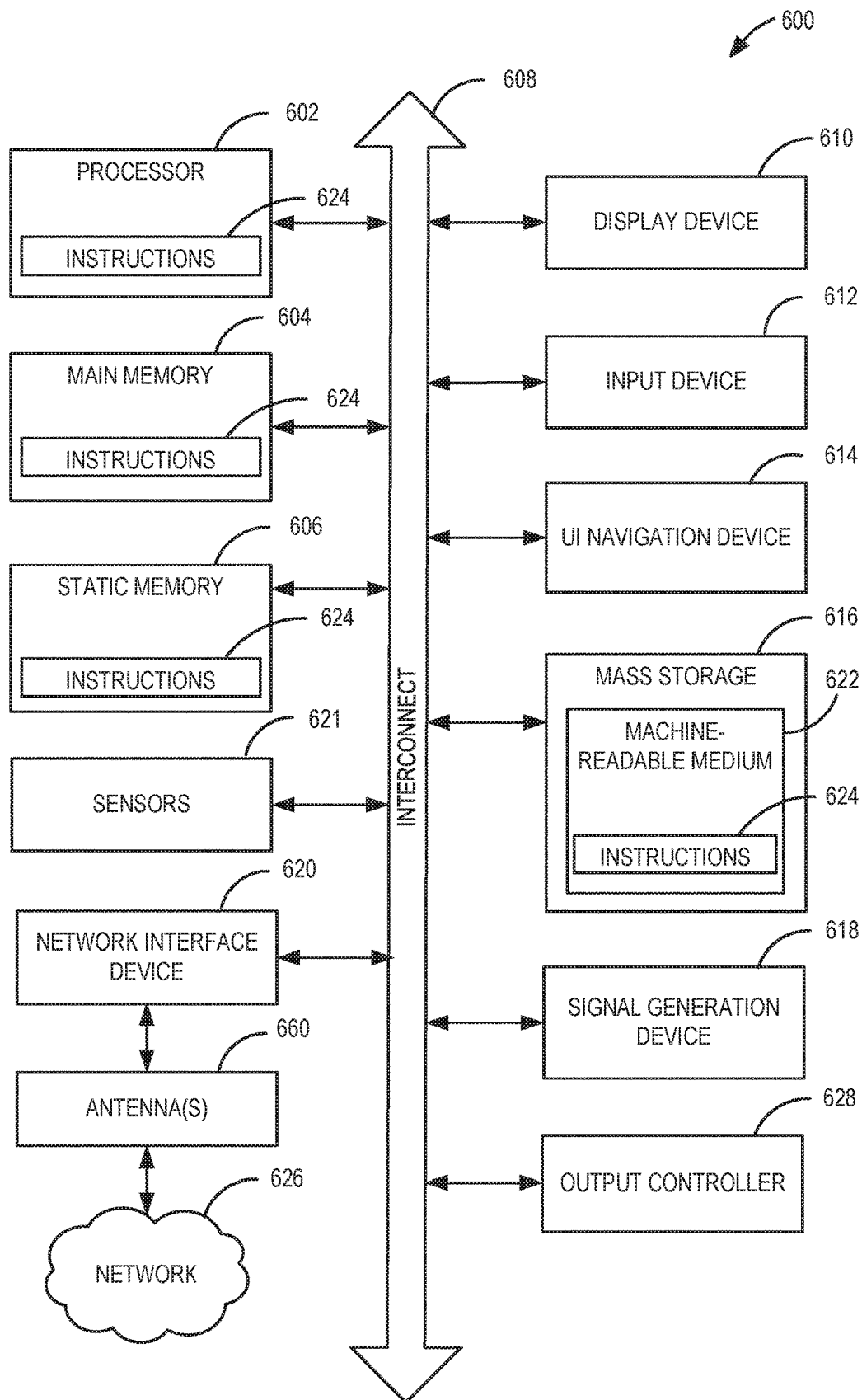
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
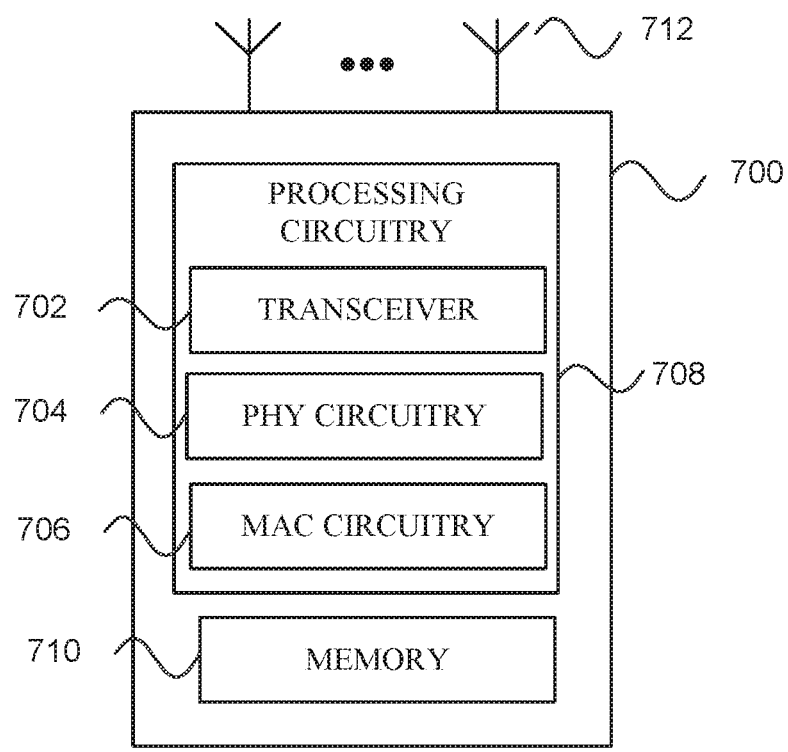
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component. e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
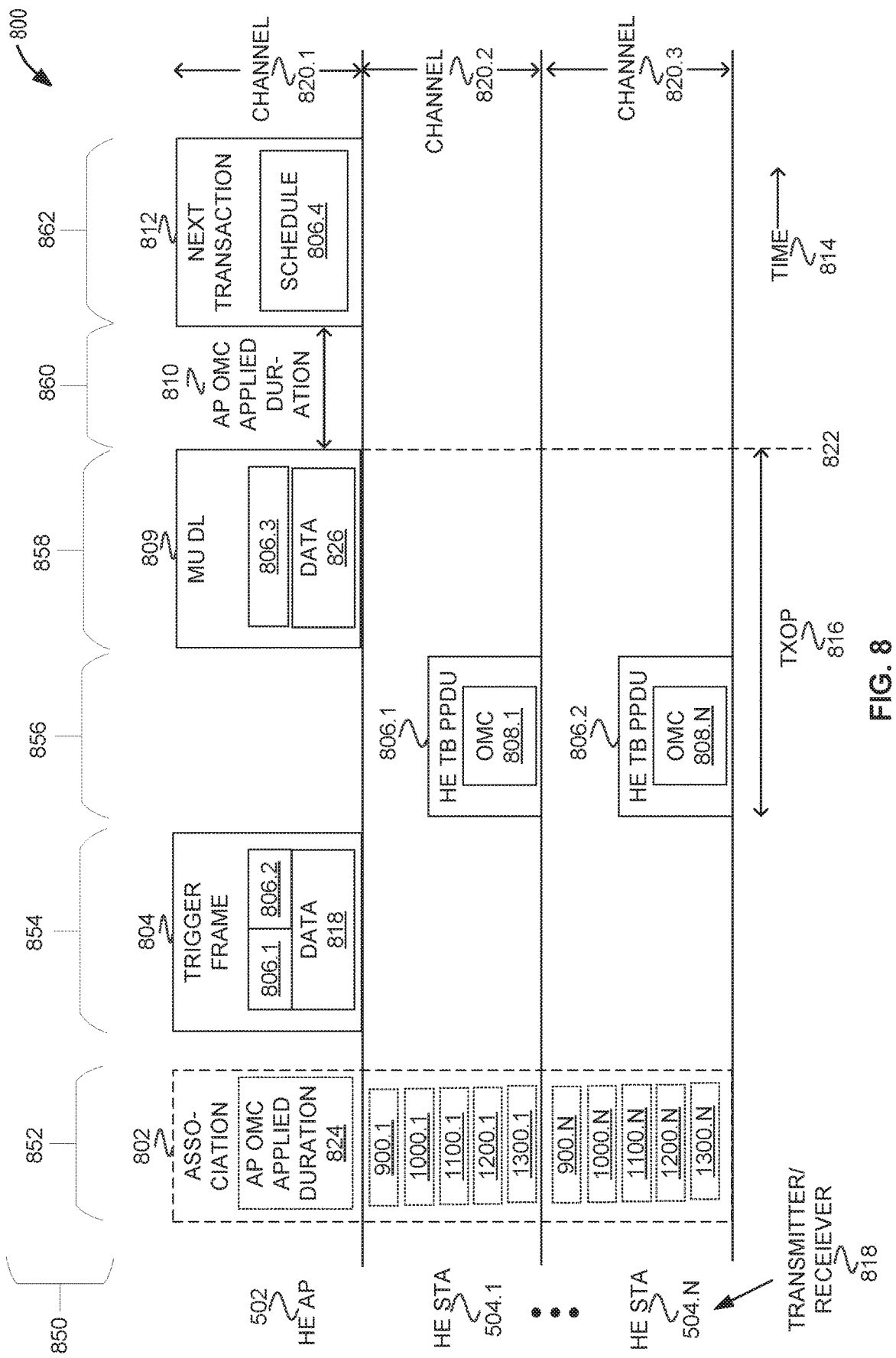
FIG. 8 illustrates a method for determining a Rx NSS for different BWs and MCSs in accordance with some embodiments.

FIG. 8 illustrates a method 800 for determining a Rx NSS for different BWs and MCSs in accordance with some embodiments. Illustrated in FIG. 8 is time 814 along a horizontal axis, channels 820 along a vertical axis, transmitter/receiver 818 along a vertical axis, and operations 850 along the top. The channels 820 may be a subchannel, a sub-band of a frequency band, a bandwidth, and/or a group of subcarriers or tones as described herein. The channels 820.1, 820.2, and 820.3 may be the same channels as one another or different channels 820. The channels 820 may overlap or be subsets of one another. The transmitter/receiver 818 may be a HE AP 502 or one or more of HE station 504.1 through HE station 504.N.

The method 800 may begin with operation 852 with the HE stations 504 associating with the HE AP 502. The HE stations 504 may transmit one or more of a supported HE-MCS and NSS set field 900, basic HE-MCS and NSS set field 1000, OMC field 1100. OM field 1200, and/or supported VHT-MCS and NSS set field 1300. The HE AP 502 may transmit AP OMC applied duration 824 which may indicate a duration for the HE AP 502 to apply changes to the Rx NSS transmitted in the OMC field 808. The AP OMC applied duration 824 may be part of a HE MAC capabilities information field (not illustrated). HE stations 504 may use the AP OMC applied duration 824 to determine when changes to Rx NSS determined for the HE stations 504 by the HE AP 502 will take effect. Before the AP OMC applied duration 824 has transpired after the receipt of the OMC field 808, the HE station 504 should assume that the HE AP 502 may use an old value of Rx NSS, in accordance with some embodiments. The HE stations 504 should not adjust their capabilities until after the AP OMC applied duration 824 plus the end of a current TXOP (e.g., TXOP 816). In some embodiments, the value of the AP OMC applied duration 824 may be indicated in units of time units (TU).

The OMC field 1100 may change the number of Rx NSS for the HE station 504 that transmitted it. For example, Rx NSS field 1102 (FIG. 11) may be different (greater or lesser) than a previous value of Rx NSS field 1102, e.g., as transmitted during operation 852. The OMC field 1100 may be part of a MAC portion of a HE PPDU, e.g., a HE TB PPDU 806. The HE AP 502 may have to respond to the HE stations 504 UL transmission in as little as Arbitration inter-frame spacing (AIFS) number (AIFSN) for an access class (AC)(AIFSN[AC]). In some embodiments, the duration indicated by the AP OMC applied duration field 824 may be sufficient time for the HE AP 502 to determine the new Rx NSS for each BW and HE-MCS based on the value of the OMC field 1100.

The method 800 may continue at operation 854 with the HE AP 502 transmitting a trigger frame 804. The trigger frame 804 may include data 818 for downlink (DL) transmission and a DL schedule 806.1 and an uplink (UL) schedule 806.2. The DL schedule 806.1 may be generated based on one or more of 900, 1000, 1100, and 1200, for each HE station 504. The DL schedule 806.1 may indicate a BW, MCS, and number of spatial streams (which may be based on a determined Rx NSS for a BW and MCS for the corresponding HE station 504) for each of the HE stations 504 that are to receive data 818. The HE AP 502 may determine a maximum number Rx NSS for each of the HE stations 504 for a BW and MCS and generate the DL schedule 806.1 based on the determined Rx NSS for each of the HE stations 504. The HE AP 502 may determine the Rx NSS for each of the HE stations 504 using one or more of methods 1400, 1500, 1600, 1700, and 2500, and/or as described in conjunction with FIGS. 9 through 13, in accordance with some embodiments. The HE stations 504 indicated in the DL schedule 806.1 may decode the data 818 in accordance with some embodiments. In some embodiments, the DL schedule 806.1 may be part of a HE SIG-B. In some embodiments, the data 818 may be transmitted as part of VHT PPDUs, HE PPDUs, or EHT PPDUs.

The method 800 continues at operation 856 with the HE stations 504 transmitting HE trigger-based (TB) PPDUs 806 in accordance with the UL schedule 806.2. The HE TB PPDUs 806 may include OMC field 808. The OMC field 808 may be the same or similar to OMC field 1100.

The HE AP 502 may receive the HE TB PPDUs 806. The HE AP 502 may decode the OMC fields 808 and determine new Rx NSS for the HE stations 504. In some embodiments, the HE AP 502 may be limited to receiving 72 OMC fields 808 simultaneously from HE stations 504 in an UL MU operation (e.g., in response to a trigger frame). The HE AP 502 may not be able to compute for each BW and HE-MCS of each HE station 504 the changes from the OMC fields 808 in under a predetermined time.

The method 800 may continue at operation 858 with the HE AP 502 transmitting MU DL 809, which may be a trigger frame. The HE AP 502 may generate a DL schedule 806.3, which may be based on Rx NSS values that are not based on the OMC 808 or may be based on the OMC 808 depending on whether the HE AP 502 had time to process the OMCs 808. The DL schedule 806.3 may be the same or similar to schedule 806.1. The HE stations 504 may use the DL schedule 806.3 to determine how to decode the data 826, e.g., NSS, MCS, BW, resource unit, encoding type, etc.

The method 800 may continue at operation 860 with the HE AP 502 processing the OMCs 808 and determining new Rx NSS for an AP OMC applied duration 810. The method 800 may continue at operation 862 with a next transaction 812. The next transaction 812 may include a DL schedule 806.4, which is based on the OMC fields 808 since the HE AP 502 had time to process the OMCs 808.

The method 800 may be performed by apparatuses of the HE stations 504. The method 800 may be performed by an apparatus of the HE AP 502. One or more operations 850 may not be performed. Additionally, the method 800 may include one or more additional operations.

Figure 9:
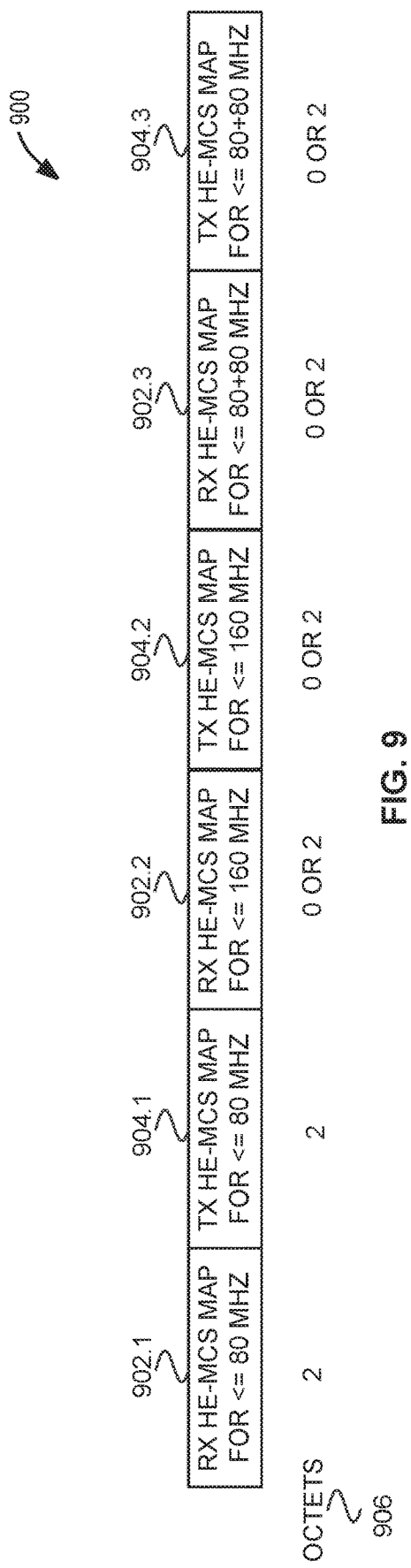
FIG. 9 illustrates supported HE-MCS and NSS set field in accordance with some embodiments.

FIG. 9 illustrates supported HE-MCS and NSS set field 900 in accordance with some embodiments. Illustrated in FIG. 9 is HE-MCS and NSS set field 900 and octets 906. Octets 906 indicates a number of octets for each of the fields 902, 904 of the HE-MCS and NSS set field 900. Fields 902.2, 904.2, 902.3, and 904.3 are optional, in accordance with some embodiments. The HE-MCS and NSS set field 900 may be part of a HE capabilities element (not illustrated).

The receive (Rx) HE-MCS Map<=80 MHz 902.1 indicates the maximum value of the MCS of a PPDU that can be received at all channel widths less than or equal to 80 MHz supported by the HE station 504 for each number of spatial streams. The transmit (Tx) HE-MCS Map<=80 MHz 904.1 indicates the maximum value of the MCS of a PPDU that can be transmitted at all channel widths less than or equal to 80 MHz supported by the HE station 504 for each number of spatial streams.

The Rx HE-MCS Map 160 MHz 902.2 indicates the maximum value of the MCS of a PPDU that can be received at 160 MHz channel width supported by the HE station 504 for each number of spatial streams. The Tx HE-MCS Map 160 MHz 904.2 indicates the maximum value of the MCS of a PPDU that can be transmitted at 160 MHz channel width supported by the HE station 504 for each number of spatial streams.

The Rx HE-MCS Map 80+80 MHz 902.3 indicates the maximum value of the MCS of a PPDU that can be received at 80+80 MHz channel width supported by the HE station 504 for each number of spatial streams. The Tx HE-MCS Map 80+80 MHz 904.3 indicates the maximum value of the MCS of a PPDU that can be transmitted at 80+80 MHz channel width supported by the HE station 504 for each number of spatial streams.

Figure 10:
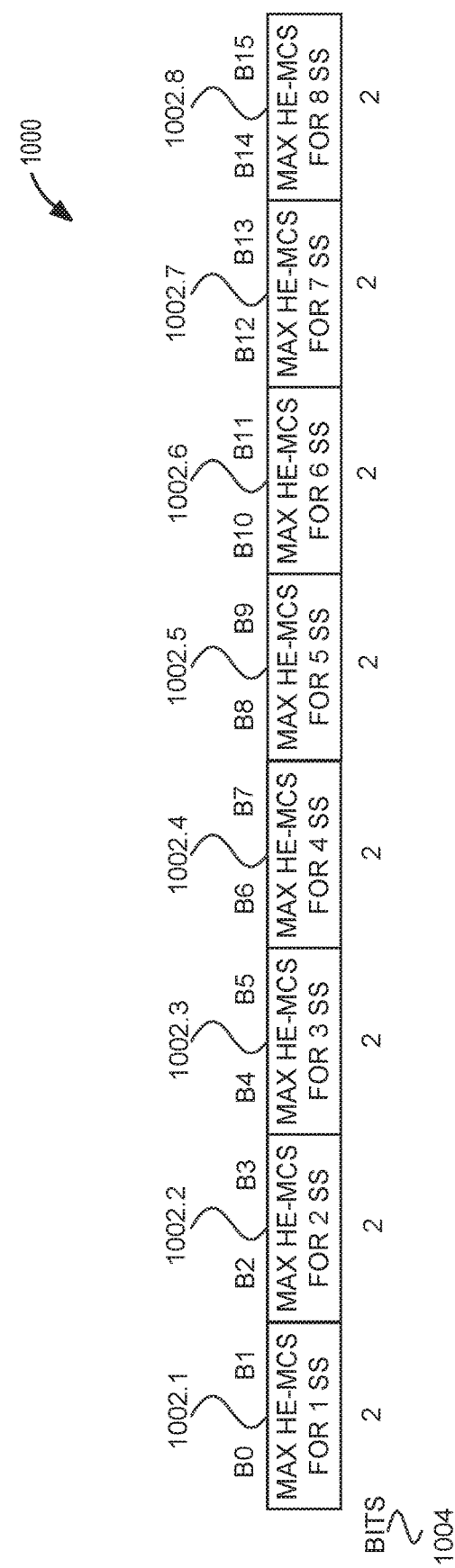
FIG. 10 illustrates Rx HE-MCS map and transmit (Tx) HE-MCS map subfields and basic HE-MCS and NSS set field in accordance with some embodiments.

Each of the fields 902, 904 may be a Rx HE-MCS map and Tx HE-MCS map subfields and basic HE-MCS and NSS set field 1000 as described in conjunction with FIG. 10.

FIG. 10 illustrates Rx HE-MCS map and transmit (Tx) HE-MCS map subfields and basic HE-MCS and NSS set field 1000 in accordance with some embodiments. Illustrated in FIG. 10 is fields 1002 and bits 1004. Bits 1004 may indicate a number of bits used to represent each field 1002.

The field 1002 may include Max HE-MCS for 1 SS 1002.1, Max HE-MCS for 2 SS 1002.2, Max HE-MCS for 3 SS 1002.3, Max HE-MCS for 4 SS 1002.4, Max HE-MCS for 5 SS 1002.5, Max HE-MCS for 6 SS 1002.6, Max HE-MCS for 7 SS 1002.7, and Max HE-MCS for 8 SS 1002.8.

In some embodiments, each Max HE-MCS for n SS field 1002.$n$ (where n=1, . . . , 8) is encoded as follows: 0 indicates support for HE-MCS 0-7 for n spatial streams; 1 indicates support for HE-MCS 0-9 for n spatial streams; 2 indicates support for HE-MCS 0-11 for n spatial streams; and, 3 indicates that n spatial streams is not supported for HE PPDUs.

Figure 11:
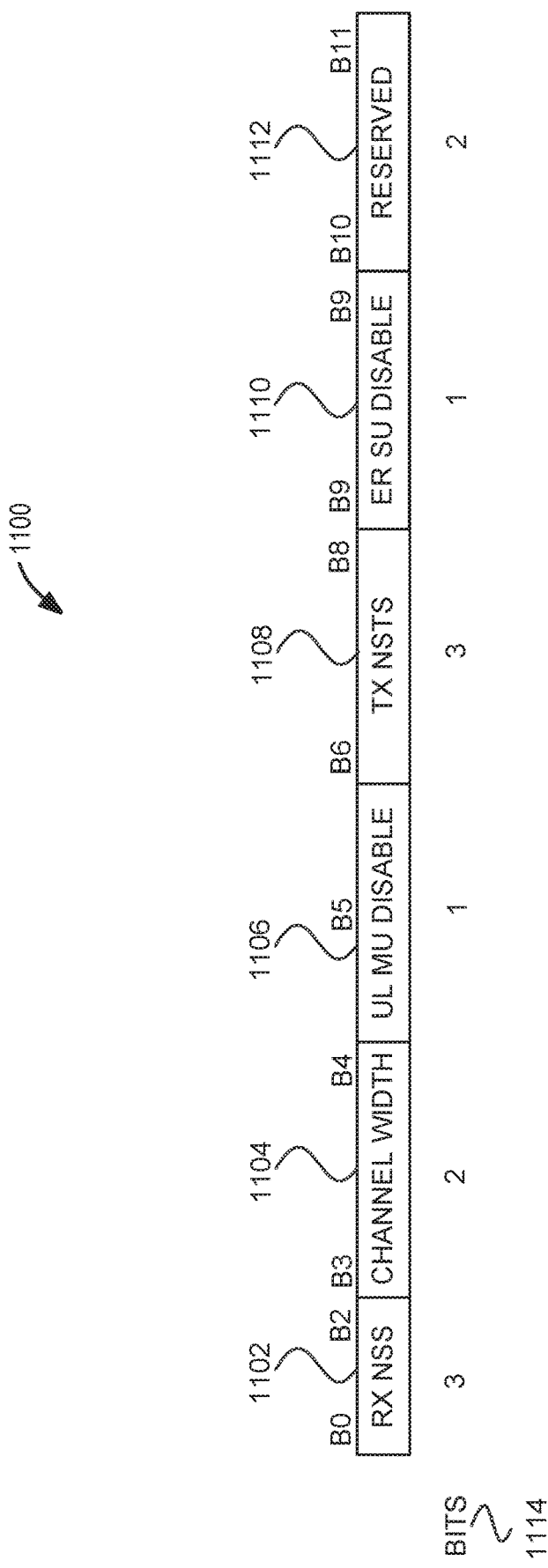
FIG. 11 illustrates an operating mode (OM) control (OMC) field 1100 in accordance with some embodiments.

FIG. 11 illustrates an operating mode (OM) control (OMC) field 1100 in accordance with some embodiments. Illustrated in FIG. 11 is RX NSS field 1102, channel width field 1104. UL MU disable field 1106, TX NSTS field 1108. ER SU disable field 1110, and reserved field 1112. The RX NSS field 1102 indicates the maximum number of spatial streams, $N_{SS}$, that the HE station 504 supports for receiving a PPDU with bandwidths less than or equal to 80 MHz. The value of RX NSS field 1102 may be one less than $N_{SS}$. The RX support for PPDUs with a bandwidth greater than 80 MHz may be determined as follows. $N_{SS}$ for a HE-MCS and BW (>80 MHz) of a HE PPDU for a HE station 504 may be given by Equation (1), in accordance with some embodiments.

Equation (1): floor (Rx-NSS-from-OMI×(Max-HE-NSS-at-BW/Max-HE-NSS-at-80)), where: Rx-NSS-from-OMI is the value of Rx NSS field 1102; Max-HE-NSS-at-BW is the maximum HE NSS among all HE-MCS at BW MHz from the supported HE-MCS and NSS set field 900; and, Max-HE-NSS-at-80 is the maximum HE NSS among all HE-MCS at 80 MHz from the supported HE-MCS and NSS set field 900.

The channel width field 1104 indicates the operating channel width support by the HE station 504 for both reception and transmitting, e.g., 0 for a primary 20 MHz, 1 for a primary 40 MHz, 2 for primary 80 MHz channel, and 3 for 160 MHz and 80+80 MHz channel.

The UL MU disable field 1106 indicates whether UL MU operation is suspected. The TX NSTS field 1108 indicates a maximum number of space-time streams that the HE station 504 supports in transmission and is set to one less than the actual number. The ER SU disable field 1110 indicates whether reception of 242-tone HE extended-range (ER) single-user (SU) PPDUs is disabled. In some embodiments an OMC field 1100 is a control information subfield for an OMC field 1100.

In some embodiments, the OMC field 1100 may be part of a MAC portion of a HE PPDU. In some embodiments, the OMC field 1100 may enable a HE station 504 to reduce the number of receive and/or transmit chains (i.e., the number of antennas indicated as supported) to the HE AP 502 (and/or another HE station 504) without having to transmit a separate packet, e.g., an OM notification frame.

Figure 12:
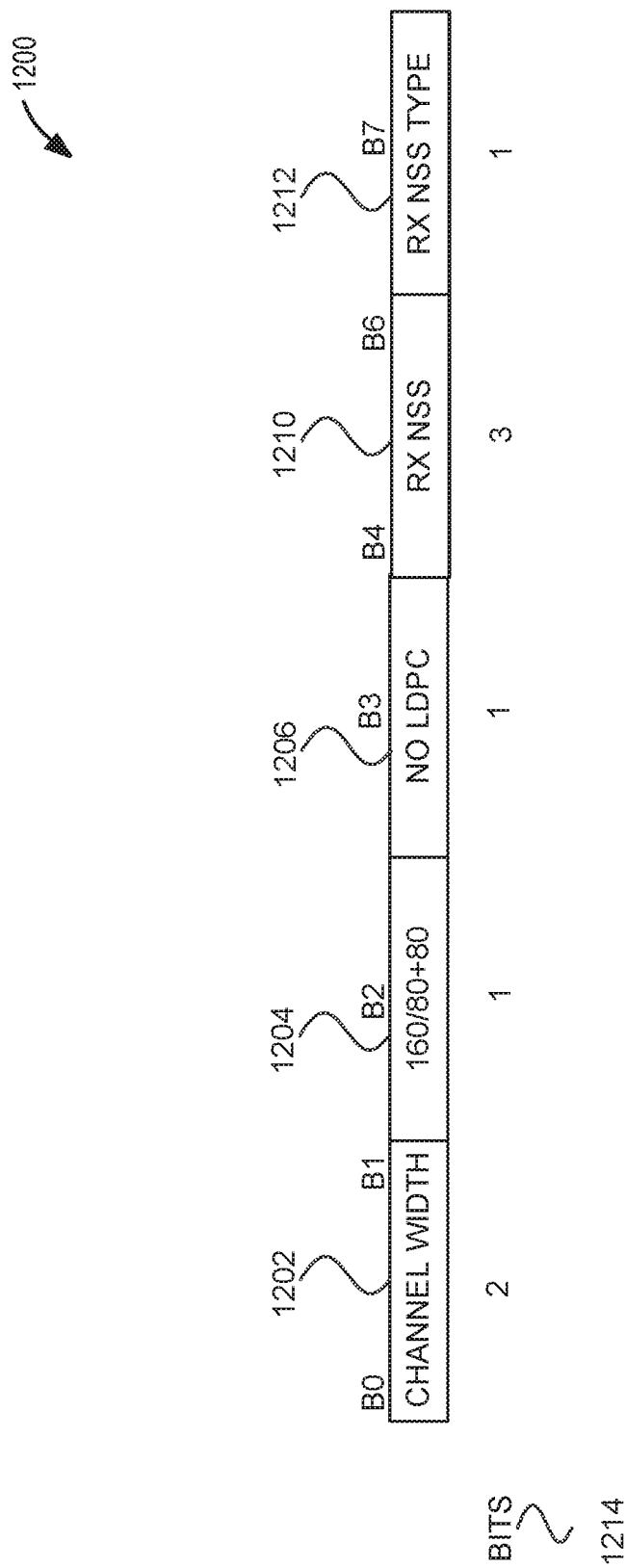
FIG. 12 illustrates an OM field in accordance with some embodiments.

FIG. 12 illustrates an OM field 1200 in accordance with some embodiments. Illustrated in FIG. 12 is channel width field 1202, 160/80+80 field 1204, No low-density parity-check (LDPC) field 1206, RX NSS field 1210, and Rx NSS type field 1212. The channel width field 1202 may indicate the supported channel width for a VHT station or another type of station. The OM field 1200 may be part of an OM notification frame (not illustrated).

The 160/80+80 field 1204 indicates whether 160 MHz and 80+80 MHz are supported. The No LDPC field 1206 indicates whether the station prefers not to receive LDPC encoded PPDUs.

Rx NSS field 1210 indicates the maximum number of spatial streams that the station can receive in combination with other information, if the value of RX NSS type field 1212 is zero. The Rx NSS type field 1212 may indicate a type of Rx NSS. The Rx NSS support for a given HE-MCS and HE PPDU BW at an HE station 504 that transmitted the operating mode field 1200 is given by Equation (2), in accordance with some embodiments.

Equation (2): floor (Rx-NSS-from-OMF×(Max-HE-NSS-at-BW/Max-HE-NSS-at-80)), where Rx-NSS-from-OMF is Rx NSS field 1210; and, Max-HE-NSS-at-BW is the maximum HE NSS among all HE-MCS at BW from the HE-MCS and NSS set field 900 of the HE station 504.

Figure 13:
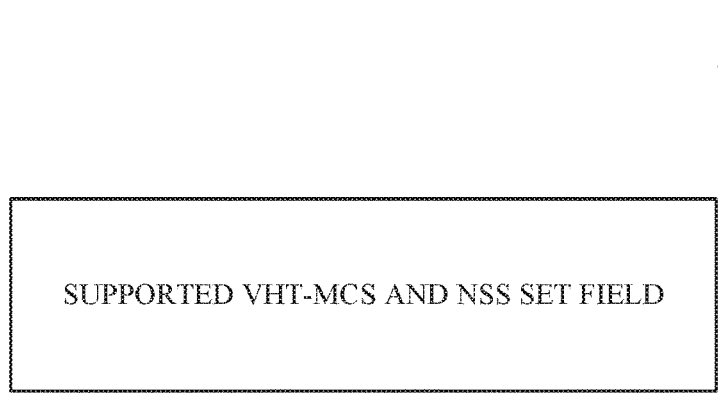
FIG. 13 illustrates a supported very-high throughput (VHT)-MCS and NSS set field in accordance with some embodiments.

FIG. 13 illustrates a supported very-high throughput (VHT)-MCS and NSS set field 1300 in accordance with some embodiments. The supported VHT-MCS and NSS set field 1300 may be part of a VHT capabilities information field (not illustrated) in accordance with some embodiments. The supported VHT-MCS and NSS set field 1300 may indicate a maximum number of Rx spatial streams that can be sent to the station in a VHT PPDU. The supported VHT-MCS and NSS set field 1300 may be the same or similar as described in the IEEE 802.11ac and IEEE 802.11ax standards.

In some embodiments, the value of Max VHT NSS for a given MCS is equal to the smaller of: a maximum value of n for which the Max VHT-MCS for n SS has a value that indicates support for that MAC (0, 1 or 2 for MCS 0-7, 1 or 2 for MCS 8, 2 for MCS 9); and, the maximum supported NSS as indicated by the value of the Rx NSS field of the OM Control field 1200 and other information.

Figure 14:
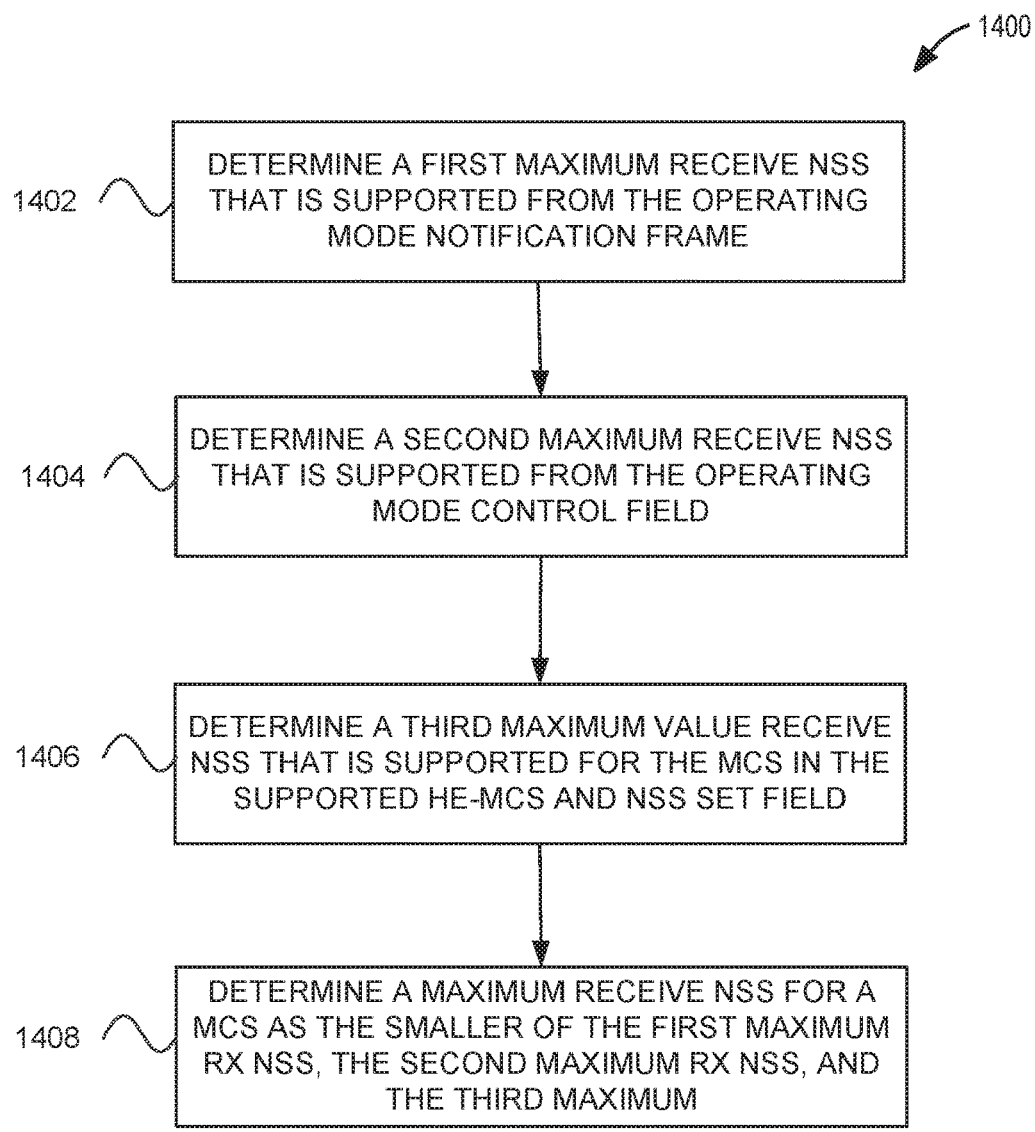
FIG. 14 illustrates a method for determining a Rx NSS for different BWs and MCSs in accordance with some embodiments.

FIG. 14 illustrates a method 1400 for determining a Rx NSS for different BWs and MCSs in accordance with some embodiments. The method 1400 may begin at operation 1402 with determining a first maximum Rx NSS that is supported from the operation notification frame. For example, the operation notification frame my include a OM field 1200. The first maximum may be a maximum supported NSS as indicated by a value of the Rx NSS field 1210 if the value of Rx NSS type field is 0 (zero). For example, the first maximum may be determined based on equation (2) or the first maximum may be based on a value of the Rx NSS field 1210.

The method 1400 may continue at operation 1404 with determining a second maximum Rx NSS that is supported from the OMC field. For example, the second maximum may be based on determining a value of the Rx NSS field 1102 as described in conjunction with FIG. 11.

The method 1400 may continue at operation 1406 with determining a third maximum value Rx NSS that is supported for the MCS in the supported HE-MCS and NSS set field. For example, using the supported HE-MCS and NSS set field 900, determine a maximum value n for which the max HE-MCS for n SS has a value that indicates support for the MCS.

The method 1400 may continue at operation 1408 with determining a maximum Rx NSS for a MCS as the smaller of the first maximum, the second maximum, and the third maximum. For example, a HE AP 502 (FIG. 8) may determine maximum Rx NSS based on 900, 1000, 1100, and/or 1200.

The method 1400 may continue with additional operations that use the determined maximum receive NSS, e.g., a trigger frame with a resource allocation based on the determined maximum receive NSS may be encoded or a single user (SU) PPDU may be encoded based on the determined maximum receive NSS. The method 1400 may be performed by apparatuses of the HE stations 504. The method 1400 may be performed by an apparatus of the HE AP 502. One or more operations may not be performed. Additionally, the method 1400 may include one or more additional operations.

Figure 15:
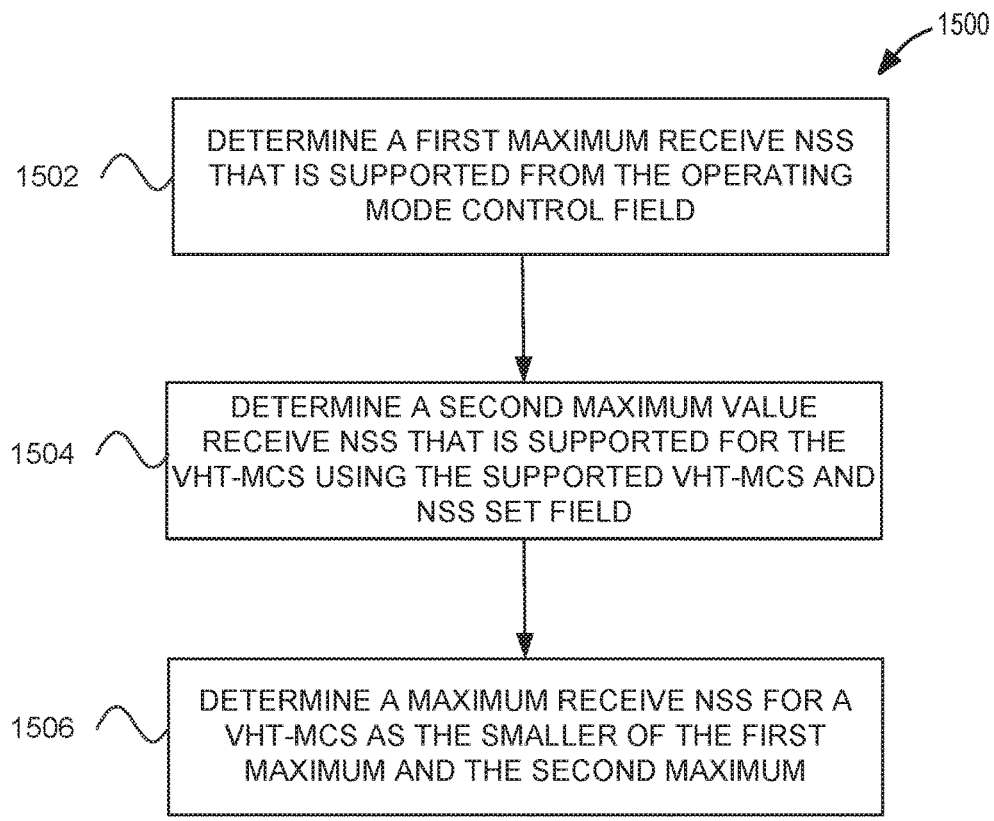
FIG. 15 illustrates a method for determining a Rx NSS for different BWs and VHT-MCSs in accordance with some embodiments.

FIG. 15 illustrates a method 1500 for determining a Rx NSS for different BWs and VHT-MCSs in accordance with some embodiments. The method 1500 may begin with determining a first maximum Rx NSS that is supported from the OMC field. For example, the first maximum may be based on determining a value of the Rx NSS field 1102 as described in conjunction with FIG. 11.

The method 1500 may continue at operation 1504 with determining a second maximum value for Rx NSS that is supported for the VHT-MCS using the supported VHT-MCS and NSS set field. For example, the supported VHT-MCS and NSS set field 1300 may be used as described in conjunction with FIG. 13 to determine the second maximum. The supported VHT-MCS and NSS set field 1300 may indicate a maximum number of Rx spatial streams that can be sent to the station in a VHT PPDU.

The method 1500 continues at operation 1506 with determining a maximum Rx NSS for a VHT-MCS as the smaller of the first maximum and the second maximum. For example, HE AP 502 (FIG. 8) may determine the Rx NSS for different BWs and VHT-MCSs based on one or more of 900, 1000, 1100, 1200, 1300. The HE AP 502 may transmit VHT-PPDUs to the HE stations 504 based on the maximum Rx NSS for a VHT-MCS. For example, the HE AP 502 may generate a schedule and then transmit data to HE stations 504 with VHT-PPDUs.

The method 1500 may continue with additional operations that use the determined maximum receive NSS, e.g., a trigger frame with a resource allocation based on the determined maximum receive NSS may be encoded or a SU PPDU may be encoded based on the determined maximum receive NSS. The method 1500 may be performed by apparatuses of the HE stations 504. The method 1500 may be performed by an apparatus of the HE AP 502. One or more operations may not be performed. Additionally, the method 1500 may include one or more additional operations.

Figure 16:
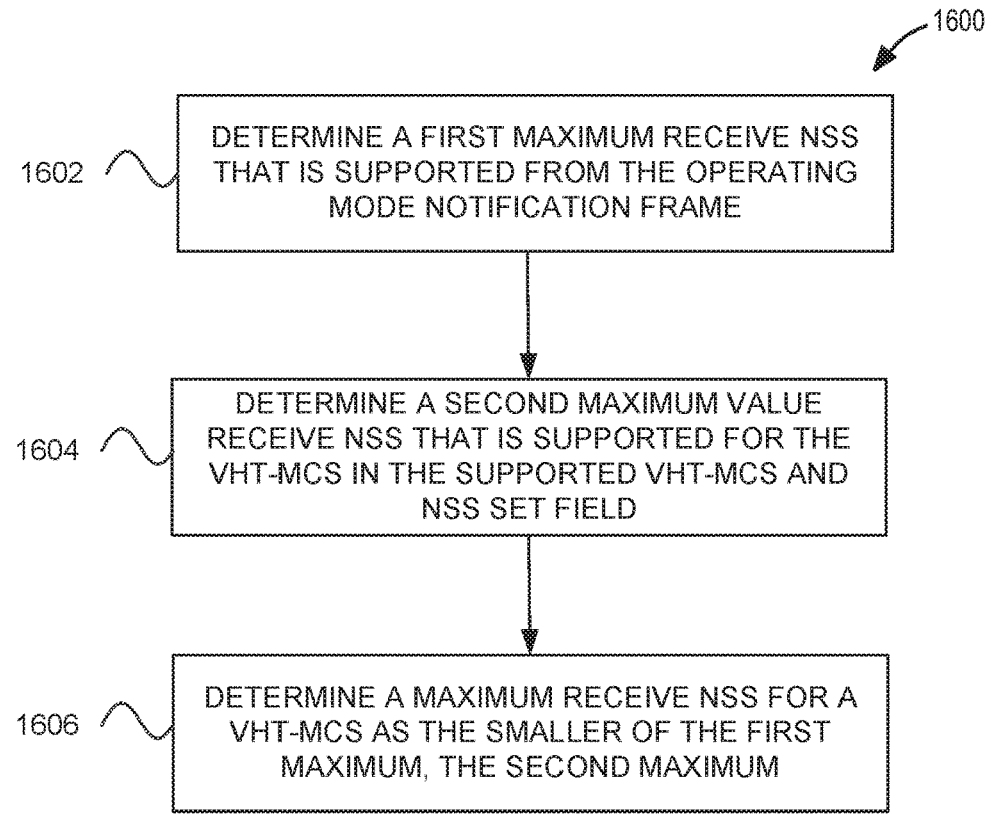
FIG. 16 illustrates a method for determining a Rx NSS for different BWs and VHT-MCSs in accordance with some embodiments.

FIG. 16 illustrates a method 1600 for determining a Rx NSS for different BWs and VHT-MCSs in accordance with some embodiments. The method 1600 may begin at operation 1602 with determining a first maximum Rx NSS that is supported from the operation notification frame. For example, the operation notification frame my include a OM field 1200. The first maximum may be a maximum supported NSS as indicated by a value of the Rx NSS field 1210 if the value of Rx NSS type field is 0 (zero). For example, the first maximum may be determined based on equation (2) or the first maximum may be based on a value of the Rx NSS field 1210.

The method 1600 may continue at operation 1604 with determining a second maximum value for Rx NSS that is supported for the VHT-MCS using the supported VHT-MCS and NSS set field. For example, the supported VHT-MCS and NSS set field 1300 may be used as described in conjunction with FIG. 13 to determine the second maximum. The supported VHT-MCS and NSS set field 1300 may indicate a maximum number of Rx spatial streams that can be sent to the station in a VHT PPDU.

The method 1600 continues at operation 1606 with determining a maximum Rx NSS for a VHT-MCS as the smaller of the first maximum and the second maximum. For example, HE AP 502 (FIG. 8) may determine the Rx NSS for different BWs and VHT-MCSs based on one or more of 900, 1000, 1100, 1200, 1300. The HE AP 502 may transmit VHT-PPDUs to the HE stations 504 based on the maximum Rx NSS for a VHT-MCS. For example, the HE AP 502 may generate a schedule and then transmit data to HE stations 504 with VHT-PPDUs.

The method 1600 may continue with additional operations that use the determined maximum receive NSS, e.g., a trigger frame with a resource allocation based on the determined maximum receive NSS may be encoded or a SU PPDU may be encoded based on the determined maximum receive NSS. The method 1600 may be performed by apparatuses of the HE stations 504. The method 1600 may be performed by an apparatus of the HE AP 502. One or more operations may not be performed. Additionally, the method 1600 may include one or more additional operations.

In some embodiments, there are two methods to determine a Rx NSS for a MCS and BW. A first method is to use the value indicated in the Rx NSS field 1102 of the OMC field 1100 to indicate a value for Rx NSS for all HE-MCSs and BW. A second method is to determine the Rx NSS for a MCS and BW by the Equation 3, in accordance with some embodiments.

Equation (3) floor (Rx-NSS-from-OMC×(Max-HE-NSS-at-BW/Max HE-NSS-at 80 MHz), where Rx-NSS-from-OMC is value indicated in the Rx NSS field 1102 of the OMC field 1100; Max-HE-NSS-at-BW is the maximum supported Rx NSS for the HE-MSC and BW from the HE-MCS and NSS set field 900; and, Max-HE-NSS-at-80 is the maximum supported Rx NSS for the HE-MSC and 80 MHz BW from the HE-MCS and NSS set field 900.

The following examples illustrate the operation of the first method and the second method. Example 1, for a BW and MCS, the HE-MCS and NSS set field 900 indicates the following: that a maximum supported Rx NSS for BWs smaller than 80 MHz is 4; that a maximum supported Rx NSS for 160 MHz is 2; and, that the maximum supported Rx NSS for 80+80 MHz is 2.

For the first method, the HE station 502 cannot indicate Rx NSS larger than 2 in OMC field 1100 because the indication will be applied to BW larger than 80 MHz and the HE station 504 cannot support more than 2 Rx NSS (assuming that the HE-MCS and NSS set field 900 accurately indicates the capabilities of the HE station 504). The HE station 504 may not be able to use 4 Rx NSS for BWs smaller than 80 MHs with the values of example 1 and using the first method.

For the second method, assume that the HE station 504 indicates Rx NSS is equal to 1 in the OMC field 1110. Then based on equation (3), the HE station 504 indicates that the maximum supported Rx NSS for a BW smaller than 80 MHz is 1; that the maximum supported Rx NSS for 160 MHz BW is 0; and, that the maximum support Rx NSS for 80+80 MHz BW is 0. However, based on the HE-MCS and NSS set field 900, the HE station 504 can support 1 Rx NSS for 160 MHz BW and 80+80 MHz BW. Therefore, based on equation (3) and the example, the HE station 504 cannot fully utilize the capabilities of the HE station 504 with 1 Rx NSS stream for 160 MHz BW and 80+80 MHz BW.

Figure 17:
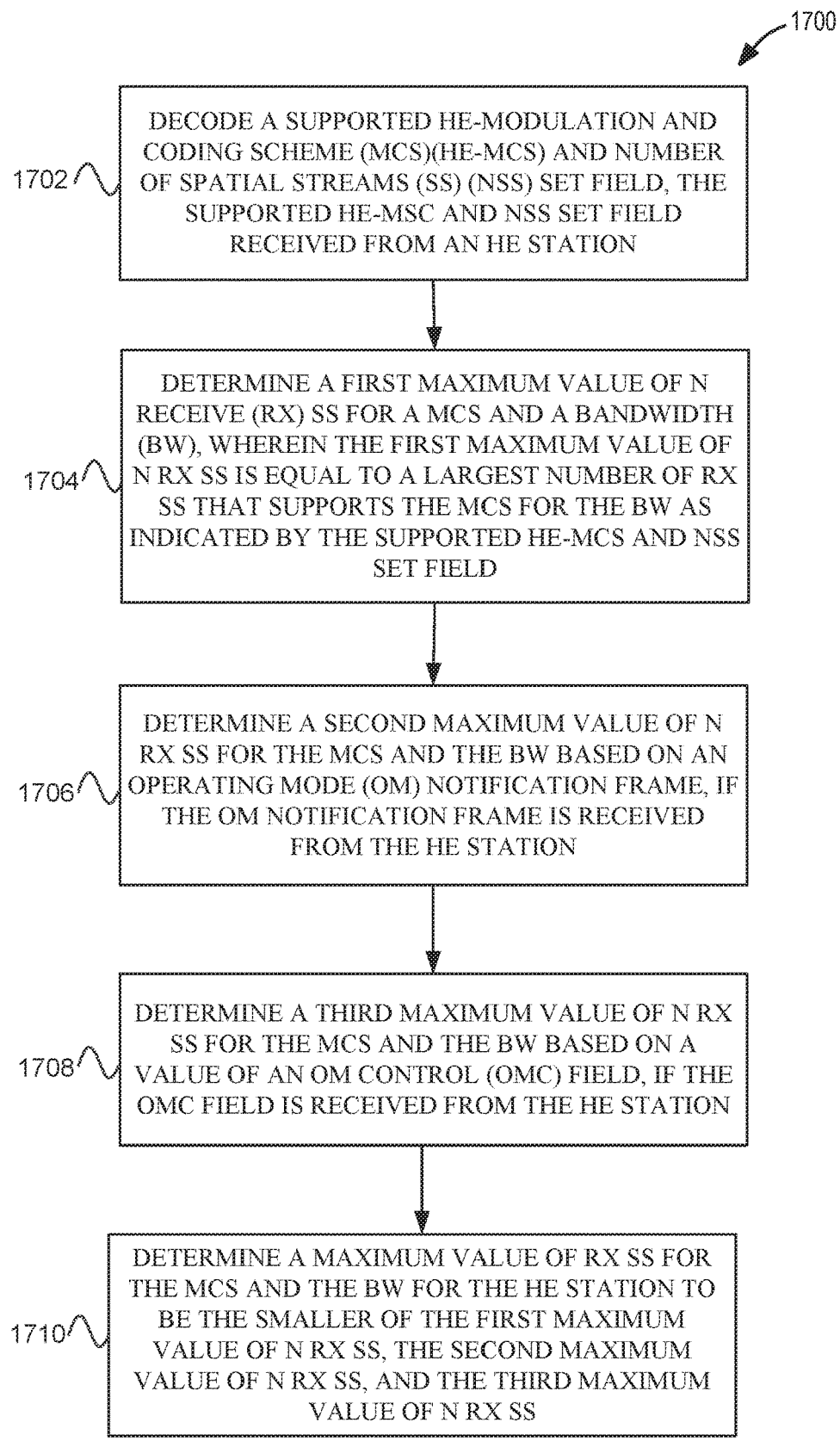
FIG. 17 illustrates a method for determining a Rx NSS for different BWs and MCSs in accordance with some embodiments.

FIG. 17 illustrates a method 1700 for determining a Rx NSS for different BWs and MCSs in accordance with some embodiments. The method 1700 begins at operation 1702 with decoding a supported HE-MCS and NSS set field, the supported HE-MSC and NSS set field received from an HE station. For example, HE AP 502 (see FIG. 8) may receive supported HE-MCS and NSS set field 900 from HE stations 504.

The method 1700 may continue at operation 1704 with determining a first maximum value of N Rx SS for a MCS and a BW, where the first maximum value of N Rx SS is equal to a largest number of Rx SS that supports the MCS for the BW as indicated by the supported HE-MCS and NSS set field. For example, HE AP 502 may determine a first maximum value of N Rx SS for a MCS and a BW based on supported HE-MCS and NSS set field 900. The HE AP 502 may determine the first maximum value of N Rx SS for a MCS and a BW as described in conjunction with operation 1406 of FIG. 14.

The method 1700 may continue at operation 1706 with determining a second maximum value of N Rx SS for the MCS and the BW based on an operating mode OM notification frame, if the OM notification frame is received from the HE station. For example, HE AP 502 may receive OM field 1200 and determine the second maximum. The HE AP 502 may determine the second maximum as disclosed in conjunction with operation 1402 of FIG. 14.

The method 1700 may continue at operation 1708 with determining a third maximum value of N Rx SS for the MCS and the BW based on a value of an OMC field, if the OMC field is received from the HE station. For example, the HE AP 502 (see FIG. 8) may receive an OMC field 1100. The HE AP 502 may determine the third maximum based on operation 1404 of FIG. 14.

The method 1700 may continue at operation 1710 with determining a maximum value of Rx SS for the MCS and the BW for the HE station to be the smaller of the first maximum value of N Rx SS, the second maximum value of N Rx SS, and the third maximum value of N Rx SS. For example, HE AP 502 (see FIG. 8) may determine the maximum value of Rx SS for the MCS and the BW, e.g., during operation 852. The HE AP 502 may determine the maximum value based on operation 1408 of FIG. 14.

The method 1700 may continue with additional operations that use the determined maximum receive NSS, e.g., a trigger frame with a resource allocation based on the determined maximum receive NSS may be encoded or a SU PPDU may be encoded based on the determined maximum receive NSS. The method 1700 may be performed by an apparatus of a HE AP 502, a HE AP 502, an apparatus of a HE station 504, and/or a HE station 504, in accordance with some embodiments. One or more of the operations of method 1700 may not be performed. Additionally, one or more additional operations may be performed as part of method 1700.

Figure 18:
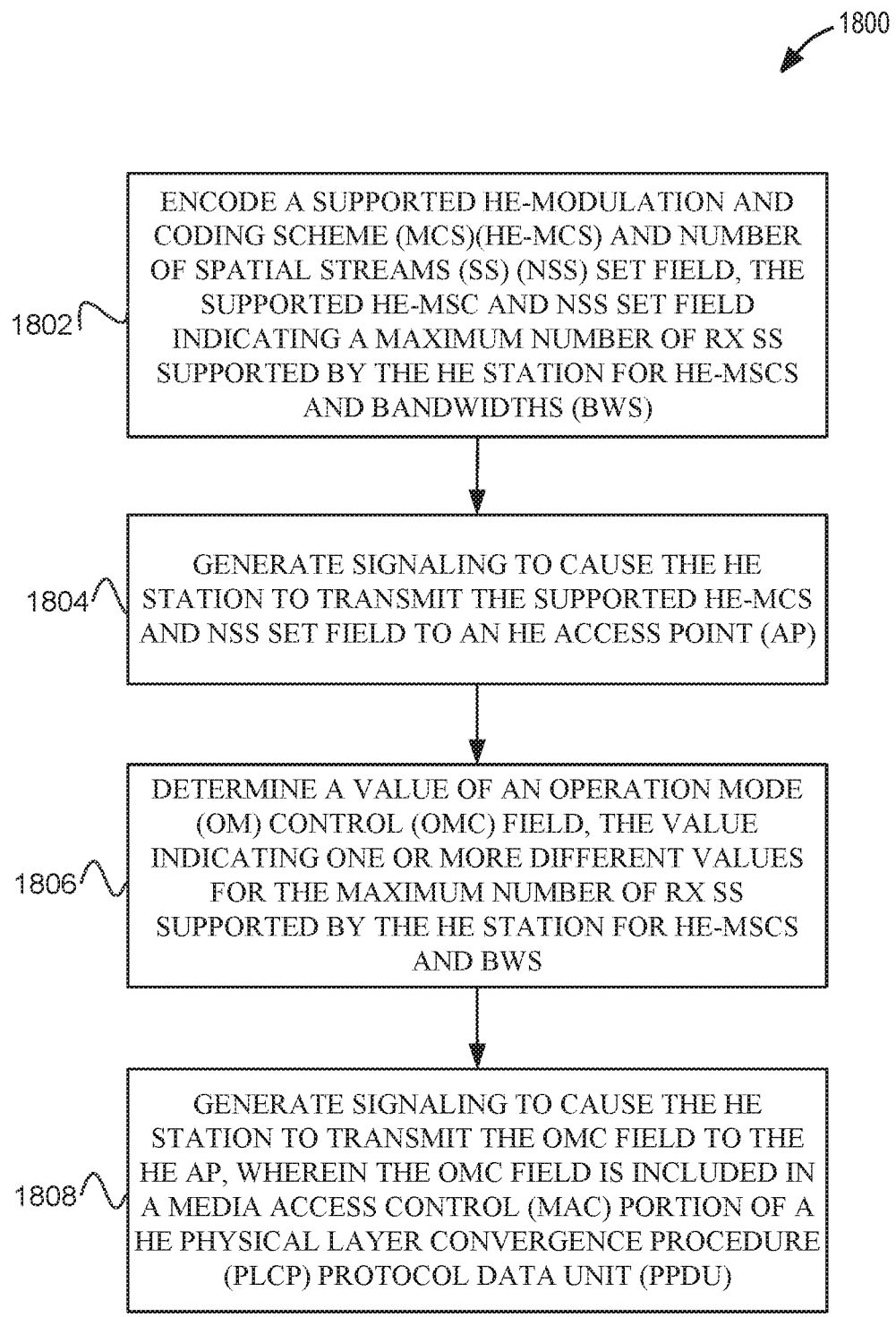
FIG. 18 illustrates a method for determining a Rx NSS for different BWs and MCSs in accordance with some embodiments.

FIG. 18 illustrates a method 1800 for determining a Rx NSS for different BWs and MCSs in accordance with some embodiments. The method 1800 may begin at operation 1802 with encoding a supported HE-MCS and NSS set field, the supported HE-MSC and NSS set field indicating a maximum number of Rx SS supported by the HE station for HE-MSCs and bandwidths (BWs). For example, HE station 504 (FIG. 8) may encode supported HE-MCS and NSS set field 900. The HE station 504 may encode the supported HE-MCS and NSS set field 900 in accordance with operation 1406 of FIG. 14.

The method 1800 may continue at operation 1804 with generating signaling to cause the HE station to transmit the supported HE-MCS and NSS set field to an HE AP. For example, an apparatus of HE station 504 (see FIG. 8) may generate signaling to cause the HE station 504 to transmit the supported HE-MCS and NSS set field to the HE AP 502.

The method 1800 may continue at operation 1806 with determining a value of an OMC field, the value indicating one or more different values for the maximum number of Rx SS supported by the HE station for HE-MSCs and BWs. For example, HE station 504 may determine a value for OMC field 1100 (e.g., Rx NSS 1102). The HE station 504 may determine the value of the OMC field 1100 in accordance with operation 1404. The HE station 504 may determine the value of the OMC field 1100 to accommodate a targeted number of Rx SS for each MSC and BW in consideration of the current supported HE-MCS and NSS set field and the rules for determining a Rx SS for each MSC and BW for both a supported HE-MCS and NSS set field and OMC field.

The method 1800 may continue at operation 1808 with generating signaling to cause the HE station to transmit the OMC field to the HE AP, wherein the OMC field is included in a MAC portion of a PPDU. For example, HE station 504 of FIG. 8 may transmit OMC field 1100 to HE AP 502. HE station 502 may determine the value of the OMC field 1100 based on operation 1706 of FIG. 17 and/or 1404 of FIG. 14.

The method 1800 may be performed by an apparatus of a HE AP 502, a HE AP 502, an apparatus of a HE station 504, and/or a HE station 504, in accordance with some embodiments. One or more of the operations of method 1800 may not be performed. Additionally, one or more additional operations may be performed as part of method 1800.

FIG. 19 illustrates a service field bit assignment 1900 in accordance with some embodiments. In some embodiments, service field bit assignment 1900 may be the same or similar as FIG. 17-6 of IEEE Std 802.11™ 2016. FIG. 20 illustrates contents of the first seven bits of the scrambling sequence 2000 in accordance with some embodiments. FIG. 20 may be the same or similar to Table 17-7 of IEEE Std 802.11™-2016. FIG. 21 illustrates RXVECTOR parameter CH_BANDWIDTH_IN_NON_HT values 2100 in accordance with some embodiments. FIG. 21 may be the same or similar as Table 17-9 of IEEE Std 802.11™-2016. FIG. 22 illustrates TXVECTOR parameter CH_BANDWIDTH_IN_NON_HT values 2200 in accordance with some embodiments. FIG. 22 may be the same or similar as Table 17-8 of IEEE Std 802.11™-2016. FIG. 19-22 are described in conjunction with one another.

A transmitter address (TA) of control frames (e.g., clear-to-send, CTS, request-to-send, RTS, etc.) may be set to a bandwidth signaling TA by setting the individual/group bit of the MAC address to 1. If the bandwidth signaling TA is transmitted, the bits of the service field (e.g., reserved service bits 1906 of FIG. 19) are used to indicate bandwidth information of the PPDU as well as an indication if the transmitting device supports static or dynamic bandwidth.

Illustrated in FIG. 19 is bits 1902, scrambler initialization 1904, reserved service bits 1906, R: reserved 1908, and transmit order 1910. The bits 0 through 6 may be used to encode the bandwidth information and an indication if static or dynamic bandwidth operation is supported.

Illustrated in FIG. 20 is parameter, condition, and first 7 bits of scrambling sequence. The parameter (e.g., TXVECTOR or RXVECTOR) indicates the parameter value. Condition indicates the condition for the parameter values. First 7 bits of scrambling sequence indicates the values and/or meaning of the first 7 bits of scrambling sequence (i.e., bits 1902, 0 through 6).

The TXVECTOR with condition CH_BANDWIDTH_IN_NON_HT IS PRESENT AND DYN_BANDWIDTH_IN_NOT_HT IS NOT PRESENT IN TXVECTOR is indicated with bits B0 through B6. B0 through B4 being equal to 5-bit pseudorandom nonzero integer if CH_BANDWIDTH_IN_NON_HT equals CBW20 and a 5-bit pseudo-random integer otherwise, CH is channel and CBW is channel bandwidth. Bits B5 and B6 are equal to CH_BANDWIDTH_IN_NON_HT, e.g., FIG. 22 indicates the mapping between B5 and B6 and an indicated bandwidth (i.e., a value of 1 indicates CBW 40).

The TXVECTOR with condition CH_BANDWIDTH_IN_NON_HT is present and DYN_BANDWIDTH_IN_NOT_HT is present is indicated with B0 through B6. B0 through B3 indicate "4-bit pseudo-random nonzero integer if CH_BANDWIDTH_IN_NON_HT equals CBW20 and DYN_BANDWIDTH_IN_NON_HT equals Static, and a 4-bit pseudorandom integer otherwise." B4 indicates whether the transmitter supports dynamic BW (e.g., 1 dynamic BW and 0 static BW). Bits B5 and B6 are equal to CH_BANDWIDTH_IN_NON_HT, e.g., FIG. 22 indicates the mapping between B5 and B6 and an indicated bandwidth (i.e., a value of 1 indicates CBW 40).

The RXVECTOR with condition CH_BANDWIDTH_IN_NON_HT is present and DYN_BANDWIDTH_IN_NOT_HT is present in TXVECTOR is indicated with B4 through B6. B4 indicates whether the transmitter supports dynamic BW (e.g., 1 dynamic BW and 0 static BW). B5 and B6 are set in accordance with CbwInNonHtTemp is set to this subfield of first 7 bits of scrambling sequence; then CbwInNonHtTemp is mapped according to FIG. 21 to CH_BANDWIDTH_IN_NON_HT. In some embodiments, the value of 3 is mapped to both CBW 160 and CBW80+80 where a value of non-zero of dot11CurrentChannelCenter Frequency Index1 indicates CBW80+80 and may indicate the center of frequency of one or both of the 80 MHz channels.

In some embodiments, APs and/or stations (e.g., 502 or 504) are configured to operate in accordance with a next generation of IEEE 802.11 where a maximum signaling is extended to at least 320 MHz, which may include an indication of contiguous 320 MHz or two segment design of 160+160 MHz. FIGS. 19-22 support only up to 160 MHz and 80+80 MHz. The AP may be termed a next generation (NG) AP and the station may be termed a NG station, in accordance with some embodiments. In some embodiments, the NG may be termed a next big thing (NBT) or EHT IEEE 802.11EHT. IEEE 802.11ax may be a legacy communication protocol in relation to NG or EHT, in accordance with some embodiments. The NG stations and NG APs may operate in the 6 GHz band as well as other bands including legacy bands.

Figure 23:
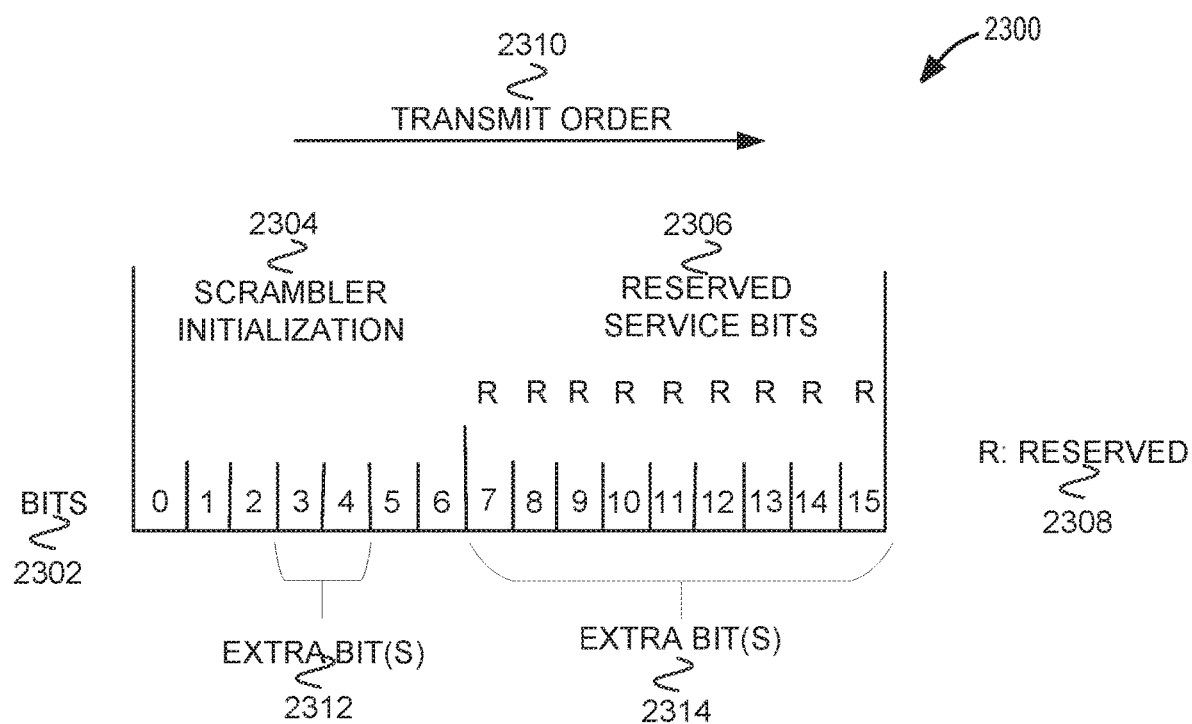
FIG. 23 illustrates a service field bit assignment in accordance with some embodiments.

FIG. 23 illustrates a service field bit assignment 2300 in accordance with some embodiments. Illustrated in FIG. 23 is bits 2302, scrambler initialization 2304, reserved service bits 2306, R: reserved 2308, transmit order 2310, extra bit(s) 2312, 2314. The bits 0 through 6 may be used to encode the bandwidth information and whether static or dynamic bandwidth is supported. Extra bit(s) 2312, 2314 indicates that one or more bits of the bits used for the pseudo-random integer (B3 or B4) or the reserved service bits 2306 may be used to indicate CH_BANDWIDTH_IN_NON_HT field (see FIG. 22 for legacy field) and CBWinNonHTtemp field (see FIG. 21 for legacy field).

For example, B5, B6, and B7 (rather than B5 and B6) may be used to represent CH_BANDWIDTH_IN_NON_HT field (see FIG. 22 for legacy field) and CBWinNonHTtemp field (see FIG. 21 for legacy field) for NG transmissions. The new bit (e.g., B7) would not be used for HE (i.e., IEEE 802.11ax) transmission, in accordance with some embodiments. In some embodiments, B3 or B7 is used in conjunction with B5 and B6 in order to indicate an additional 320 MHz mode.

The dot11CurrentChannelCenter Frequency Index1 may continue to indicate whether the BW indicated is contiguous or not, e.g., 1 indicates a 320 MHz channel and 0 indicates 160+160 MHz. Table 1 illustrates an example where three bits have been used to represent CBWinNonHTtemp with 320 MHz support. Other representations could be made. For example, there could be rows for CBW80+80+160, CBW80+80+80+80, etc. In some embodiments, 640 MHz may be supported with contiguous and/or non-contiguous.

TABLE 1

| CBWINNONHTTEMP | DOT11CURRENT CHANNELCENTER FREQUNCYINDEX 1 | RXVECTOR PARAMETER CH_BANDWIDTH_IN_NON-HT |
|---|---|---|
| 0 | 0 | CBW20 |
| 1 | 0 | CBW40 |

CBWinNonHTtemp with 320 MHz Support

TABLE 1-continued

CBWinNonHTtemp with 320 MHz Support

| CBWINNONHTTEMP | DOT11CURRENT CHANNELCENTER FREQUNCYINDEX 1 | RXVECTOR PARAMETER CH_BANDWIDTH_IN_NON-HT |
|---|---|---|
| 2 | 0 | CBW80 |
| 3 | 0 | CBW160 |
| 3 | 1 to 200 | CBW80 + 80 |
| 4 | 0 | CBW320 |
| 4 or 5 | 1 to 200 (or another value for CBW320) | CBW160 + 160 |

Table 2 illustrates an example where three bits have been used to represent CH_BANDWIDTH_IN_NON_HT with 320 MHz support. Other representations could be made. For example, there could be rows for CBW80+80+160, CBW80+80+80+80, etc.

TABLE 2

CH_BANDWIDTH_IN_NON_HT with 320 MHz Support

| 0 | 0 | CBW20 |
|---|---|---|
| 1 | 0 | CBW40 |
| 2 | 0 | CBW80 |
| 3 | 0 | CBW160 |
| 3 | 1 to 200 | CBW80 + 80 |
| 4 | 0 | CBW320 |
| 4 or 5 | 1 to 200 (or another value for CBW320) | CBW160 + 160 |

In some embodiments, one new bit is used, e.g., B3, B4, or B7, and the new bit (e.g., B3, B4, or B7), bit B5, and B6 are set to 1 to indicate CBW320. The dot11CurrentChannelCenter Frequency Index1 may continue to indicate whether the BW indicated is contiguous or not, e.g., 1 indicates a 320 MHz channel and 0 indicates 160+160 MHz.

In some embodiments, new values are assigned for a Table 1 and Table 2. E.g., CBW40 may have a different value than 1. In some embodiments, values of 5, 6, and/or 7 may be reserved or used for further noncontiguous indications of CBW320. In some embodiments, the values of FIGS. 21 and 22 are repurposed for NG stations and NG APs, e.g., 0 for 40 MHz, 1 for 80 MHz, 2 for 160 MHz, or 3 for 320 MHz.

Figure 24:
FIG. 24 illustrates a frame for 6 GHz next generation, in accordance with some embodiments.

FIG. 24 illustrates a frame 2400 for 6 GHz next generation, in accordance with some embodiments. The frame 2400 may be a PPDU, a HE PPDU, and/or a NG PPDU. The frame 2400 may include one or more of transmitter address (TA) 2402, receiver address (RA) 2404, and BW 2406.

The frame 2400 may be a NG RTS, NG CTS, and/or another type of frame, e.g., a control frame. The frame 2400 may be a CTS for 6 GHz. In some embodiments, the frame 2400 is a CTS frame that includes both a TA 2402 and RA 2404. In some embodiments, HE stations 504 and HE APs 502 may be configured to use frame 2400 when transmitting on the 6 GHz band. In some embodiments, HE stations 504 and HE AP 502 may be configured to use frame 2400. The BW field 2406 may be a field to indicate a BW. In some embodiments, BW 2406 indicates dynamic or static BW. The BW field 2406 may indicate a BW such as 20, 40, 80, 160, 320, 640, etc., and whether the BW is contiguous or not. The BW may be encoded as described in conjunction with Tables 1 and 2.

Figure 25:
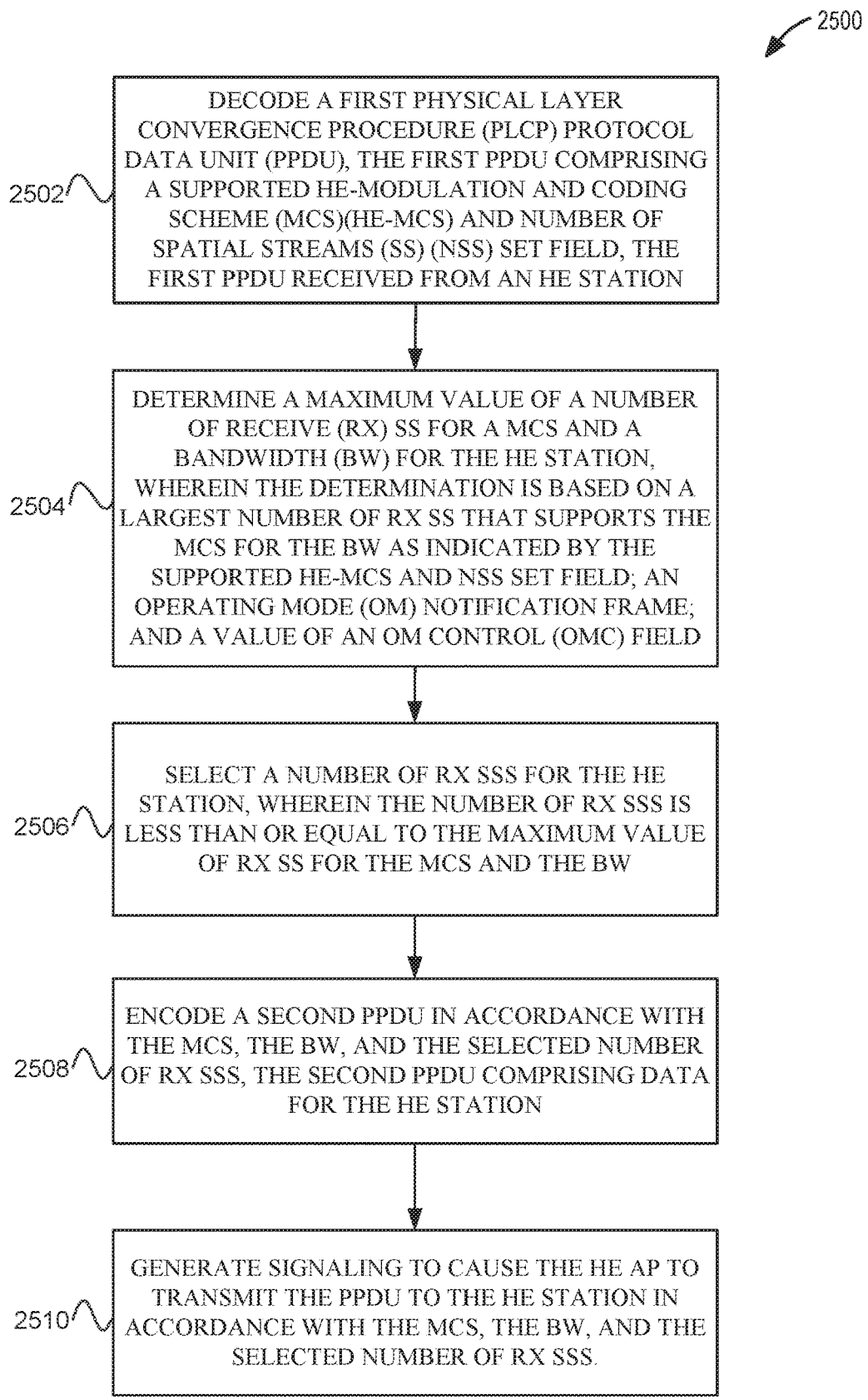
FIG. 25 illustrates a method for determining a Rx NSS for different BWs and MCSs in accordance with some embodiments.

FIG. 25 illustrates a method 2500 for determining a Rx NSS for different BWs and MCSs in accordance with some embodiments. The method 2500 begins at operation 2502 with decoding a first PPDU, the first PPDU comprising a supported HE-MCS and NSS set field, the first PPDU received from an HE station. For example, HE AP 500 (see FIG. 8) may receive supported HE-MCS and NSS set field 900 from HE stations 504.

The method 2500 continues at operation 2504 with determining a maximum value of a number of Rx SS for a MCS and a BW for the HE station, where the determination is based on a largest number of Rx SS that supports the MCS for the BW as indicated by the supported HE-MCS and NSS set field; an operating mode (OM) notification frame; and a value of an OM control (OMC) field. For example, a maximum value of a number of Rx SS for a MCS and a BW for the HE station may be determined as disclosed in conjunction with FIG. 17.

The method 2500 continues at operation 2506 with selecting a number of Rx SSs for the HE station, where the number of Rx SSs is less than or equal to the maximum value of Rx SS for the MCS and the BW. For example, HE AP 502 (see FIG. 8) may select a number of Rx SSs for the HE STAs 504.

The method 2500 may continue at operation 2508 with encoding a second PPDU in accordance with the MCS, the BW, and the selected number of Rx SSs, the second PPDU comprising data for the HE station. For example, HE AP 502 may encode MU DL 809 in accordance with the MCS, the BW, and the selected number of Rx SSs for HE STAs 504.

The method 2500 continues at operation 2510 with generating signaling to cause the HE AP to transmit the PPDU to the HE station in accordance with the MCS, the BW, and the selected number of Rx SSs. For example, an apparatus of HE AP 502 may configure HE AP 502 to transmit a PPDU, e.g., MU DL 809.

The method 2500 may be performed by an apparatus of a HE AP 502, a HE AP 502, an apparatus of a HE station 504, and/or a HE station 504, in accordance with some embodiments. One or more of the operations of method 2500 may not be performed. Additionally, one or more additional operations may be performed as part of method 2500.

The following first examples pertain to further embodiments.

Example 1 is an apparatus of a station (STA), the apparatus including: memory; and processing circuitry coupled to the memory, the processing circuitry configured to: decode a first frame, the first frame including a field indicating a bandwidth; determine the bandwidth based on the field; and encode a second frame to transmit based on the bandwidth.

In Example 2, the subject matter of Example 1 optionally includes where the field is a service field, and where the bandwidth is encoded in bits 5 and 6 for a legacy bandwidth, and where for a next generation bandwidth the bandwidth is encoded with 3 or more bits.

In Example 3, the subject matter of Example 2 optionally includes where the 3 or more bits comprise bit 5 and bit 6 of the service field and bit 3 or bit 7 of the service field, and where the 3 or more bits include an encoding for 320 MHz.

In Example 4, the subject matter of any one or more of Examples 1-3 optionally include where the field is a service field, and where the bandwidth has a first encoding for legacy frames and a second encoding for next generation frames, and where the second encoding includes an indication for 320 MHz.

In Example 5, the subject matter of any one or more of Examples 1-4 optionally include where the first frame is a smaller bandwidth than the bandwidth.

In Example 6, the subject matter of any one or more of Examples 1-5 optionally include where the first frame is a clear-to-send (CTS) frame.

In Example 7, the subject matter of any one or more of Examples 1-6 optionally include where the first frame is received on a 6 GHz bandwidth.

In Example 8, the subject matter of any one or more of Examples 1-7 optionally include where the processing circuitry is configured to: transmit and receive legacy clear-to-send (CTS) frames on 3 GHz and/or 5 GHz bandwidths and to transmit and receive CTS frames that comprise the field on a 6 GHz bandwidth.

In Example 9, the subject matter of any one or more of Examples 1-8 optionally include where the processing circuitry is further configured to: generate signaling to cause the station to transmit the second frame.

In Example 10, the subject matter of any one or more of Examples 1-9 optionally include where the second frame is a next generation clear-to-send (CTS) frame, the next generation CTS frame including a second field indicating a third bandwidth.

In Example 11, the subject matter of Example 10 optionally includes where the third bandwidth is based on the bandwidth.

In Example 12, the subject matter of any one or more of Examples 1-11 optionally include where the first frame is received from an access point.

In Example 13, the subject matter of any one or more of Examples 1-12 optionally include where the STA is one or more from the following group: an Institute of Electrical and Electronic Engineers (IEEE) 802.11ax access point, an IEEE 802.11ax station, an IEEE 802.11 station, an IEEE 802.11 access point, an IEEE 802.11 next generation station, and a IEEE 802.11 next generation access point.

In Example 14, the subject matter of any one or more of Examples 1-13 optionally include transceiver circuitry coupled to the processing circuitry; and one or more antennas coupled to the transceiver circuitry.

Example 15 is a non-transitory computer-readable storage medium that stores instructions for execution by one or more processors of an apparatus of a station (STA), the instructions to configure the one or more processors to: decode a first frame, the first frame including a field indicating a bandwidth; determine the bandwidth based on the field; and encode a second frame to transmit based on the bandwidth.

In Example 16, the subject matter of Example 15 optionally includes where the field is a service field, and where the bandwidth is encoded in bits 5 and 6 for a legacy bandwidth, and where for a next generation bandwidth the bandwidth is encoded with 3 or more bits.

In Example 17, the subject matter of any one or more of Examples 15-16 optionally include where the 3 or more bits comprise bit 5 and bit 6 of the service field and bit 3 or bit 7 of the service field, and where the 3 or more bits include an encoding for 320 MHz.

Example 18 is a method performed by an apparatus of a station (STA), the method including: decoding a first frame, the first frame including a field indicating a bandwidth; determining the bandwidth based on the field; and encoding a second frame to transmit based on the bandwidth.

In Example 19, the subject matter of Example 18 optionally includes where the field is a service field, and where the bandwidth is encoded in bits 5 and 6 for a legacy bandwidth, and where for a next generation bandwidth the bandwidth is encoded with 3 or more bits.

In Example 20, the subject matter of any one or more of Examples 18-19 optionally include where the 3 or more bits comprise bit 5 and bit 6 of the service field and bit 3 or bit 7 of the service field, and where the 3 or more bits include an encoding for 320 MHz.

Example 21 is an apparatus of an access point (AP), the apparatus including: memory; and processing circuitry coupled to the memory, the processing circuitry configured to: encode a field to indicate a first bandwidth; encode a first frame, the first frame including the field indicating a bandwidth; and generate signaling to cause the AP to transmit the first frame on a second bandwidth.

In Example 22, the subject matter of Example 21 optionally includes where the first bandwidth is greater than the second bandwidth.

In Example 23, the subject matter of any one or more of Examples 21-22 optionally include where the field is a service field, and where the bandwidth is encoded in bits 5 and 6 for a legacy bandwidth, and where for a next generation bandwidth the bandwidth is encoded with 3 or more bits.

In Example 24, the subject matter of Example 23 optionally includes where the 3 or more bits comprise bit 5 and bit 6 of the service field and bit 3 or bit 7 of the service field, and where the 3 or more bits include an encoding for 320 MHz.

In Example 25, the subject matter of any one or more of Examples 21-24 optionally include where the field is a service field, and where the bandwidth has a first encoding for legacy frames and a second encoding for next generation frames, and where the second encoding includes an indication for 320 MHz.

In Example 26, the subject matter of any one or more of Examples 21-25 optionally include where the first frame is a clear-to-send (CTS) frame.

In Example 27, the subject matter of any one or more of Examples 21-26 optionally include where the first frame is received on a 6 GHz bandwidth.

In Example 28, the subject matter of any one or more of Examples 21-27 optionally include where the processing circuitry is configured to: transmit and receive legacy clear-to-send (CTS) frames on 3 GHz and/or 5 GHz bandwidths and to transmit and receive CTS frames that comprise the field on a 6 GHz bandwidth.

In Example 29, the subject matter of any one or more of Examples 21-28 optionally include next where the AP is one or more from the following group: an Institute of Electrical and Electronic Engineers (IEEE) 802.11ax access point, an IEEE 802.11ax station, an IEEE 802.11 station, an IEEE 802.11 access point, an IEEE 802.11 next generation station, and a IEEE 802.11 next generation access point.

In Example 30, the subject matter of any one or more of Examples 21-29 optionally include transceiver circuitry coupled to the processing circuitry; and one or more antennas coupled to the transceiver circuitry.

The following second examples pertain to further embodiments.

Example 1 is an apparatus of a high-efficiency (HE) access point (AP), the apparatus including: memory; and processing circuitry coupled to the memory, the processing circuitry configured to: decode a first physical Layer Convergence Procedure (PLCP) Protocol Data Unit (PPDU), the first PPDU including a supported HE-modulation and coding scheme (MCS)(HE-MCS) and number of spatial streams (SS) (NSS) set field, the first PPDU received from an HE station; determine a maximum value of a number of receive (Rx) SS for a MCS and a bandwidth (BW) for the HE station, where the determination is based on a largest number of Rx SS that supports the MCS for the BW as indicated by the supported HE-MCS and NSS set field; an operating mode (OM) notification frame, and a value of an OM control (OMC) field; select a number of Rx SSs for the HE station, where the number of Rx SSs is less than or equal to the maximum value of Rx SS for the MCS and the BW; encode a second PPDU in accordance with the MCS, the BW, and the selected number of Rx SSs, the second PPDU including data for the HE station; and generate signaling to cause the HE AP to transmit the PPDU to the HE station in accordance with the MCS, the BW, and the selected number of Rx SSs.

In Example 2, the subject matter of Example 1 optionally includes where the determine the maximum value of the number of Rx SS for the MCS and the BW for the HE station further includes: determine a first maximum value of a number of Rx SS for the MCS and the BW, where the first maximum value of the number of Rx SS is equal to the largest number of Rx SS that supports the MCS for the BW as indicated by the supported HE-MCS and NSS set field; determine a second maximum value of the number of Rx SS for the MCS and the BW based on the OM notification frame, if the OM notification frame is received from the HE station in the first PPDU or a first previous PPDU; determine a third maximum value of the number of Rx SS for the MCS and the BW based on a value of the OMC field, if the OMC field is received from the HE station in the first PPDU or a second previous PPDU; and determine the maximum value of Rx SS for the MCS and the BW for the HE station to be the smaller of the first maximum value of the number of Rx SS, the second maximum value of the number of Rx SS, and the third maximum value of the number of Rx SS.

In Example 3, the subject matter of any one or more of Examples 1-2 optionally include where the supported HE-MCS and NSS set field includes a Rx HE-MCS Map for less than equal to 80 MHz, a Rx HE-MCS Map for 160 MHz, and a Rx HE-MCS Map for 80+80 MHz, and where each of the Rx HE-MCS Map for less than equal to 80 MHz, the Rx HE-MCS Map for 160 MHz, and the Rx HE-MCS Map for 80+80 MHz includes a Rx HE-MCS map and Basic HE-MCS and NSS set field.

In Example 4, the subject matter of Example 3 optionally includes where the Rx HE-MCS map and Basic HE-MCS and NSS set field includes a maximum (Max) HE-MCS for 1 SS field, a Max HE-MCS for 2 SS field, a Max HE-MCS for 3 SS field, a Max HE-MCS for 3 SS field, a Max HE-MCS for 4 SS field, a Max HE-MCS for 5 SS field, a Max HE-MCS for 6 SS field, a Max HE-MCS for 7 SS field, and a Max HE-MCS for 8 SS field.

In Example 5, the subject matter of Example 4 optionally includes where for each of the Max HE-MCS for 1 SS field, the Max HE-MCS for 2 SS field, the Max HE-MCS for 3 SS field, the Max HE-MCS for 3 SS field, the Max HE-MCS for 4 SS field, the Max HE-MCS for 5 SS field, the Max HE-MCS for 6 SS field, the Max HE-MCS for 7 SS field, and the Max HE-MCS for 8 SS field, a 0 indicates support for a value of HE-MCS of 0-7 for a corresponding number of SS, 1 indicates support for the value of HE-MCS of 0-9 for the corresponding number of SS, 2 indicates support for the value of HE-MCS of 0-11 for the corresponding number of SS, and 3 indicates that the corresponding number of SS is not supported.

In Example 6, the subject matter of Example 5 optionally includes where the determine the first maximum value of N Rx SS for the MCS and the BW further includes: determine the first maximum value of N Rx SS for the MCS and the BW to be equal to a maximum value of M for which the Max HE-MCS for M SS field has a value that indicates support for the MCS, where the M is between 0 and 3, and where the Max HE-MCS for M SS field is part of a corresponding Rx HE-MCS Map field for the BW. In Example 7, the subject matter of any one or more of Examples 2-6 optionally include if the value of the Rx NSS type field is not zero.

In Example 8, the subject matter of any one or more of Examples 1-7 optionally include where the processing circuitry is further configured to: encode a third PPDU, the third PPDU including an AP OMC applied duration field, the AP OMC applied duration field indicating a duration the HE AP has to update the maximum Rx SS for the HE station after receiving an updated OMC field, where the duration does not start until an end to a current transmission opportunity; and generate signaling to cause the HE AP to transmit the third PPDU to the HE station.

In Example 9, the subject matter of Example 8 optionally includes where the processing circuitry is further configured to: decode a second OMC field from the HE station, the second OMC field part of a media access control (MAC) portion of a fourth PPDU; and determine an updated maximum Rx SS for the HE station before the expiration of the duration indicated by the AP OMC applied duration field.

In Example 10, the subject matter of any one or more of Examples 1-9 optionally include where the processing circuitry is further configured to: determine a maximum Rx SS for each of a plurality of HE stations, the plurality of HE stations including the HE station, the maximum Rx SS based on a corresponding MCS and a corresponding BW for a corresponding HE station; encode a trigger frame, the trigger frame including downlink (DL) resource units for the plurality of HE stations, where each resource unit of the resource units includes the corresponding MCS, the corresponding BW, and a number of Rx SS, where the number of Rx SS is less than or equal to a corresponding maximum Rx SS for a corresponding HE station; encode the trigger frame to further comprise data for each of the plurality of HE stations, where the data is encoded in accordance with the DL resource units; and generate signaling for the HE AP to transmit the trigger frame in accordance with the DL resource units.

In Example 11, the subject matter of any one or more of Examples 1-10 optionally include access point. In Example 12, the subject matter of any one or more of Examples 1-11 optionally include transceiver circuitry coupled to the processing circuitry. In Example 13, the subject matter of Example 12 optionally includes one or more antennas coupled to the transceiver circuitry.

Example 14 is a non-transitory computer-readable storage medium that stores instructions for execution by one or more processors of an apparatus of a high-efficiency (HE) access point (AP), the instructions to configure the one or more processors to: decode a first physical Layer Convergence Procedure (PLCP) Protocol Data Unit (PPDU), the first PPDU including a supported HE-modulation and coding scheme (MCS)(HE-MCS) and number of spatial streams (SS) (NSS) set field, the first PPDU received from an HE station; determine a maximum value of a number of receive (Rx) SS for a MCS and a bandwidth (BW) for the HE station, where the determination is based on a largest number of Rx SS that supports the MCS for the BW as indicated by the supported HE-MCS and NSS set field; an operating mode (OM) notification frame; and a value of an OM control (OMC) field; select a number of Rx SSs for the HE station, where the number of Rx SSs is less than or equal to the maximum value of Rx SS for the MCS and the BW; encode a second PPDU in accordance with the MCS, the BW, and the selected number of Rx SSs, the second PPDU including data for the HE station; and generate signaling to cause the HE AP to transmit the PPDU to the HE station in accordance with the MCS, the BW, and the selected number of Rx SSs.

In Example 15, the subject matter of Example 14 optionally includes where the instructions further configure the one or more processors to: determine a first maximum value of a number of Rx SS for the MCS and the BW, where the first maximum value of the number of Rx SS is equal to the largest number of Rx SS that supports the MCS for the BW as indicated by the supported HE-MCS and NSS set field; determine a second maximum value of the number of Rx SS for the MCS and the BW based on the OM notification frame, if the OM notification frame is received from the HE station in the first PPDU or a first previous PPDU; determine a third maximum value of the number of Rx SS for the MCS and the BW based on a value of the OMC field, if the OMC field is received from the HE station in the first PPDU or a second previous PPDU; and determine the maximum value of Rx SS for the MCS and the BW for the HE station to be the smaller of the first maximum value of the number of Rx SS, the second maximum value of the number of Rx SS, and the third maximum value of the number of Rx SS.

In Example 16, the subject matter of Example 15 optionally includes MHz includes a Rx HE-MCS map and Basic HE-MCS and NSS set field.

Example 17 is a method performed by an apparatus of a high-efficiency (HE) access point (AP), the method including: decoding a first physical Layer Convergence Procedure (PLCP) Protocol Data Unit (PPDU), the first PPDU including a supported HE-modulation and coding scheme (MCS) (HE-MCS) and number of spatial streams (SS) (NSS) set field, the first PPDU received from an HE station; determining a maximum value of a number of receive (Rx) SS for a MCS and a bandwidth (BW) for the HE station, where the determination is based on a largest number of Rx SS that supports the MCS for the BW as indicated by the supported HE-MCS and NSS set field; an operating mode (OM) notification frame; and a value of an OM control (OMC) field; selecting a number of Rx SSs for the HE station, where the number of Rx SSs is less than or equal to the maximum value of Rx SS for the MCS and the BW; encoding a second PPDU in accordance with the MCS, the BW, and the selected number of Rx SSs, the second PPDU including data for the HE station; and generating signaling to cause the HE AP to transmit the PPDU to the HE station in accordance with the MCS, the BW, and the selected number of Rx SSs.

In Example 18, the subject matter of Example 17 optionally includes the method further including: determining a first maximum value of a number of Rx SS for the MCS and the BW, where the first maximum value of the number of Rx SS is equal to the largest number of Rx SS that supports the MCS for the BW as indicated by the supported HE-MCS and NSS set field; determining a second maximum value of the number of Rx SS for the MCS and the BW based on the OM notification frame, if the OM notification frame is received from the HE station in the first PPDU or a first previous PPDU; determining a third maximum value of the number of Rx SS for the MCS and the BW based on a value of the OMC field, if the OMC field is received from the HE station in the first PPDU or a second previous PPDU; and determining the maximum value of Rx SS for the MCS and the BW for the HE station to be the smaller of the first maximum value of the number of Rx SS, the second maximum value of the number of Rx SS, and the third maximum value of the number of Rx SS.

Example 19 is an apparatus of a high-efficiency (HE) station, the apparatus including: memory; and processing circuitry coupled to the memory, the processing circuitry configured to: encode a supported HE-modulation and coding scheme (MCS)(HE-MCS) and number of spatial streams (SS) (NSS) set field, the supported HE-MSC and NSS set field indicating a maximum number of Rx SS supported by the HE station for HE-MSCs and bandwidths (BWs); generate signaling to cause the HE station to transmit the supported HE-MCS and NSS set field to an HE access point (AP); determine a value of an operation mode (OM) control (OMC) field, the value indicating one or more different values for the maximum number of Rx SS supported by the HE station for HE-MSCs and BWs; and generate signaling to cause the HE station to transmit the OMC field to the HE AP, where the OMC field is included in a media access control (MAC) portion of a HE physical Layer Convergence Procedure (PLCP) Protocol Data Unit (PPDU).

In Example 20, the subject matter of Example 19 optionally includes where the processing circuitry is further configured to: determine first maximum values of Rx SS for MCSs and BWs, where the first maximum values of N Rx SS are equal to a largest number of Rx SS that supports a MCS of the MCSs for a BW of the BWs as indicated by the supported HE-MCS and NSS set field; determine second maximum values of Rx SS for the MCSs and the BWs based on the value of the OMC field; and determine maximum values of Rx SS for the MCSs and the BWs supported by the HE station to be the smaller of the first maximum values of N Rx SS and the second maximum values of Rx SS.

In Example 21, the subject matter of Example 20 optionally includes where the processing circuitry is further configured to: decode a second PPDU from the HE AP, the second PPDU including an indication of a resource unit (RU) for the HE station to decode a data portion of the second PPDU, and where the RU indicates a BW of the BWs, a MCS of the MCSs. and a number of Rx SS, where the number of Rx SS is less than or equal to a maximum RxSS for the MCS and the BW of the maximum values of Rx SS for the MCSs and the BWs.

In Example 22, the subject matter of any one or more of Examples 20-21 optionally include where the processing circuitry is further configured to: determine a third maximum values of Rx SS for the MCSs and the BWs based on a value of an OM field; and determine an updated maximum Rx SS for the MCSs and the BWs for the HE station to be the smaller of the maximum value of Rx SS for the MCSs and BWs and the third maximum values of Rx SS for the MCSs and BWs.

In Example 23, the subject matter of any one or more of Examples 20-22 optionally include where the processing circuitry is further configured to: decode a second PPDU, the second PPDU including an AP OMC applied duration field, the AP OMC applied duration field indicating a duration the HE AP has to update the maximum Rx SS for the HE station after receiving an updated OMC field, where the duration does not start until an end to a current transmission opportunity, and refrain from changing a number of Rx antennas after transmitting the updated OMC field until after the duration has transpired.

In Example 24, the subject matter of any one or more of Examples 19-23 optionally include access point. In Example 25, the subject matter of Example 24 optionally includes transceiver circuitry coupled to the processing circuitry; and one or more antennas coupled to the transceiver circuitry.

Example 26 is a non-transitory computer-readable storage medium that stores instructions for execution by one or more processors of an apparatus of a high-efficiency (HE) station, the instructions to configure the one or more processors to: encode a supported HE-modulation and coding scheme (MCS)(HE-MCS) and number of spatial streams (SS) (NSS) set field, the supported HE-MSC and NSS set field indicating a maximum number of Rx SS supported by the HE station for HE-MSCs and bandwidths (BWs); generate signaling to cause the HE station to transmit the supported HE-MCS and NSS set field to an HE access point (AP); determine a value of an operation mode (OM) control (OMC) field, the value indicating one or more different values for the maximum number of Rx SS supported by the HE station for HE-MSCs and BWs; and generate signaling to cause the HE station to transmit the OMC field to the HE AP, where the OMC field is included in a media access control (MAC) portion of a HE physical Layer Convergence Procedure (PLCP) Protocol Data Unit (PPDU).

In Example 27, the subject matter of Example 26 optionally includes where the instructions further configure the one or more processors to: determine first maximum values of Rx SS for MCSs and BWs, where the first maximum values of N Rx SS are equal to a largest number of Rx SS that supports a MCS of the MCSs for a BW of the BWs as indicated by the supported HE-MCS and NSS set field, determine second maximum values of Rx SS for the MCSs and the BWs based on the value of the OMC field, and determine maximum values of Rx SS for the MCSs and the BWs supported by the HE station to be the smaller of the first maximum values of N Rx SS and the second maximum values of Rx SS.

In Example 28, the subject matter of any one or more of Examples 26-27 optionally include where the instructions further configure the one or more processors to: decode a second PPDU from the HE AP, the second PPDU including an indication of a resource unit (RU) for the HE station to decode a data portion of the second PPDU, and where the RU indicates a BW of the BWs, a MCS of the MCSs, and a number of Rx SS, where the number of Rx SS is less than or equal to a maximum RxSS for the MCS and the BW of the maximum values of Rx SS for the MCSs and the BWs.

In Example 29, the subject matter of any one or more of Examples 26-28 optionally include where the instructions further configure the one or more processors to: determine a third maximum values of Rx SS for the MCSs and the BWs based on a value of an OM field; and determine an updated maximum Rx SS for the MCSs and the BWs for the HE station to be the smaller of the maximum value of Rx SS for the MCSs and BWs and the third maximum values of Rx SS for the MCSs and BWs.

In Example 30, the subject matter of any one or more of Examples 26-29 optionally include where the instructions further configure the one or more processors to: decode a second PPDU including an AP OMC applied duration field, the AP OMC applied duration field indicating a duration the HE AP has to update the maximum Rx SS for the HE station after receiving an updated OMC field, where the duration does not start until an end to a current transmission opportunity; and refrain from changing a number of Rx antennas after transmitting the updated OMC field until after the duration has transpired. In Example 31, the subject matter of any one or more of Examples 26-30 optionally include access point.

Example 32 is a method performed on an apparatus of a high-efficiency (HE) station, the method including: encoding a supported HE-modulation and coding scheme (MCS) (HE-MCS) and number of spatial streams (SS) (NSS) set field, the supported HE-MSC and NSS set field indicating a maximum number of Rx SS supported by the HE station for HE-MSCs and bandwidths (BWs); generating signaling to cause the HE station to transmit the supported HE-MCS and NSS set field to an HE access point (AP); determining a value of an operation mode (OM) control (OMC) field, the value indicating one or more different values for the maximum number of Rx SS supported by the HE station for HE-MSCs and BWs; and generating signaling to cause the HE station to transmit the OMC field to the HE AP, where the OMC field is included in a media access control (MAC) portion of a HE physical Layer Convergence Procedure (PLCP) Protocol Data Unit (PPDU).

In Example 33, the subject matter of Example 32 optionally includes where the method further includes: determining first maximum values of Rx SS for MCSs and BWs, where the first maximum values of N Rx SS are equal to a largest number of Rx SS that supports a MCS of the MCSs for a BW of the BWs as indicated by the supported HE-MCS and NSS set field; determining second maximum values of Rx SS for the MCSs and the BWs based on the value of the OMC field; and determining maximum values of Rx SS for the MCSs and the BWs supported by the HE station to be the smaller of the first maximum values of N Rx SS and the second maximum values of Rx SS.

In Example 34, the subject matter of any one or more of Examples 32-33 optionally include where the method further includes: decoding a second PPDU from the HE AP, the second PPDU including an indication of a resource unit (RU) for the HE station to decode a data portion of the second PPDU, and where the RU indicates a BW of the BWs, a MCS of the MCSs, and a number of Rx SS, where the number of Rx SS is less than or equal to a maximum RxSS for the MCS and the BW of the maximum values of Rx SS for the MCSs and the BWs.

In Example 35, the subject matter of any one or more of Examples 32-34 optionally include where the method further includes: determining a third maximum values of Rx SS for the MCSs and the BWs based on a value of an OM field; and determining an updated maximum Rx SS for the MCSs and the BWs for the HE station to be the smaller of the maximum value of Rx SS for the MCSs and BWs and the third maximum values of Rx SS for the MCSs and BWs.

In Example 36, the subject matter of any one or more of Examples 32-35 optionally include where the method further includes: decoding a second PPDU, the second PPDU including an AP OMC applied duration field, the AP OMC applied duration field indicating a duration the HE AP has to update the maximum Rx SS for the HE station after receiving an updated OMC field, where the duration does not start until an end to a current transmission opportunity; and refraining from changing a number of Rx antennas after transmitting the updated OMC field until after the duration has transpired.

In Example 37, the subject matter of any one or more of Examples 32-36 optionally include access point. Example 38 is an apparatus of a high-efficiency (HE) station, the apparatus including: means for encoding a supported HE-modulation and coding scheme (MCS)(HE-MCS) and number of spatial streams (SS) (NSS) set field, the supported HE-MSC and NSS set field indicating a maximum number of Rx SS supported by the HE station for HE-MSCs and bandwidths (BWs), means for generating signaling to cause the HE station to transmit the supported HE-MCS and NSS set field to an HE access point (AP); means for determining a value of an operation mode (OM) control (OMC) field, the value indicating one or more different values for the maximum number of Rx SS supported by the HE station for HE-MSCs and BWs; and means for generating signaling to cause the HE station to transmit the OMC field to the HE AP, where the OMC field is included in a media access control (MAC) portion of a HE physical Layer Convergence Procedure (PLCP) Protocol Data Unit (PPDU).

In Example 39, the subject matter of Example 38 optionally includes where the apparatus further includes: means for determining first maximum values of Rx SS for MCSs and BWs, where the first maximum values of N Rx SS are equal to a largest number of Rx SS that supports a MCS of the MCSs for a BW of the BWs as indicated by the supported HE-MCS and NSS set field; means for determining second maximum values of Rx SS for the MCSs and the BWs based on the value of the OMC field; and means for determining maximum values of Rx SS for the MCSs and the BWs supported by the HE station to be the smaller of the first maximum values of N Rx SS and the second maximum values of Rx SS.

In Example 40, the subject matter of any one or more of Examples 38-39 optionally include where the apparatus further includes: means for decoding a second PPDU from the HE AP, the second PPDU including an indication of a resource unit (RU) for the HE station to decode a data portion of the second PPDU, and where the RU indicates a BW of the BWs, a MCS of the MCSs, and a number of Rx SS, where the number of Rx SS is less than or equal to a maximum RxSS for the MCS and the BW of the maximum values of Rx SS for the MCSs and the BWs.

In Example 41, the subject matter of any one or more of Examples 38-40 optionally include where the apparatus further includes: means for determining a third maximum values of Rx SS for the MCSs and the BWs based on a value of an OM field; and means for determining an updated maximum Rx SS for the MCSs and the BWs for the HE station to be the smaller of the maximum value of Rx SS for the MCSs and BWs and the third maximum values of Rx SS for the MCSs and BWs.

In Example 42, the subject matter of any one or more of Examples 38-41 optionally include where the apparatus further includes: means for decoding a second PPDU, the second PPDU including an AP OMC applied duration field, the AP OMC applied duration field indicating a duration the HE AP has to update the maximum Rx SS for the HE station after receiving an updated OMC field, where the duration does not start until an end to a current transmission opportunity; and means for refraining from changing a number of Rx antennas after transmitting the updated OMC field until after the duration has transpired.

In Example 43, the subject matter of any one or more of Examples 38-42 optionally include access point. Example 44 is an apparatus of a high-efficiency (HE) access point (AP), the apparatus including: means for decoding a first physical Layer Convergence Procedure (PLCP) Protocol Data Unit (PPDU), the first PPDU including a supported HE-modulation and coding scheme (MCS)(HE-MCS) and number of spatial streams (SS) (NSS) set field, the first PPDU received from an HE station; means for determining a maximum value of a number of receive (Rx) SS for a MCS and a bandwidth (BW) for the HE station, where the determination is based on a largest number of Rx SS that supports the MCS for the BW as indicated by the supported HE-MCS and NSS set field; an operating mode (OM) notification frame; and a value of an OM control (OMC) field; means for selecting a number of Rx SSs for the HE station, where the number of Rx SSs is less than or equal to the maximum value of Rx SS for the MCS and the BW; means for encoding a second PPDU in accordance with the MCS, the BW, and the selected number of Rx SSs, the second PPDU including data for the HE station; and means for generating signaling to cause the HE AP to transmit the PPDU to the HE station in accordance with the MCS, the BW, and the selected number of Rx SSs.

In Example 45, the subject matter of Example 44 optionally includes the apparatus further including: means for determining a first maximum value of a number of Rx SS for the MCS and the BW, where the first maximum value of the number of Rx SS is equal to the largest number of Rx SS that supports the MCS for the BW as indicated by the supported HE-MCS and NSS set field; means for determining a second maximum value of the number of Rx SS for the MCS and the BW based on the OM notification frame, if the OM notification frame is received from the HE station in the first PPDU or a first previous PPDU; means for determining a third maximum value of the number of Rx SS for the MCS and the BW based on a value of the OMC field, if the OMC field is received from the HE station in the first PPDU or a second previous PPDU; and means for determining the maximum value of Rx SS for the MCS and the BW for the HE station to be the smaller of the first maximum value of the number of Rx SS, the second maximum value of the number of Rx SS, and the third maximum value of the number of Rx SS.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus comprising: memory; and processing circuitry coupled to the memory, the processing circuitry configured to:

decode a first physical Layer Convergence Procedure (PLCP) Protocol Data Unit (PPDU), the first PPDU comprising a supported HE-modulation and coding scheme (MCS)(HE-MCS) and number of spatial streams (NSS) set field, the first PPDU received from an HE station, wherein the supported HE-MCS and NSS set field comprises, for a bandwidth (BW), Max HE-MCS for N SS subfields, for each of N=1, . . . , 8;

determine, for the HE STA, a maximum receive (Rx) NSS for a MCS and the BW as equal to the smaller of: a maximum value of the N for which a corresponding Max HE-MCS for N SS subfield has a value that indicates support for the HE-MCS, and, of: a maximum supported NSS as indicated by a value of an Rx NSS field of an Operating Mode (OM) Notification frame if a value of an Rx NSS Type subfield indicates 0, or of: a maximum supported NSS as indicated by an Rx NSS subfield of an OM Control subfield;

select a number of Rx SSs for the HE station, wherein the number of Rx SSs is less than or equal to the maximum value of Rx NSS for the MCS and the BW;

encode a second PPDU in accordance with the HE-MCS, the BW, and the selected number of Rx SSs, the second PPDU for the HE STA; and generate signaling to cause the HE AP to transmit the second PPDU to the HE STA in accordance with the HE-MCS, the BW, and the selected number of Rx SSs.

2. The apparatus of claim 1, wherein for each of the Max HE-MCS for N SS subfields, for each of N=1, ..., 8 r, a 0 indicates support for a value of HE-MCS of 0-7 for a corresponding number of SS, 1 indicates support for the value of HE-MCS of 0-9 for the corresponding number of SS, 2 indicates support for the value of HE-MCS of 0-11 for the corresponding number of SS, and 3 indicates that the corresponding number of SS is not supported.

3. The apparatus of claim 1, wherein the OM notification frame comprises an OM field, the OM field comprising the Rx NSS field and the Rx NSS type subfield, wherein the value of the Rx NSS field indicates a maximum of spatial streams that the HE station can receive for an HE PPDU.

4. The apparatus of claim 1, wherein the processing circuitry is further configured to:

encode a third PPDU, the third PPDU comprising an AP OM Control applied duration field, the AP OM Control applied duration field indicating a duration the HE AP has to update the maximum Rx NSS for the HE-MCS for the HE station after receiving an updated OM Control field, wherein the duration does not start until an end to a current transmission opportunity; and generate signaling to cause the HE AP to transmit the third PPDU to the HE station.

5. The apparatus of claim 4, wherein the processing circuitry is further configured to:

decode a second OMC field from the HE station, the second OMC field part of a media access control (MAC) portion of a fourth PPDU; and determine an updated maximum Rx NSS for the HE-MCS for the HE station before the expiration of the duration indicated by the AP OMC applied duration field.

6. The apparatus of claim 1, wherein the processing circuitry is further configured to:

determine a maximum Rx NSS for the HE-MCS for each of a plurality of HE stations, the plurality of HE stations including the HE station, the maximum Rx NSS for the HE-MCS;

encode a trigger frame, the trigger frame comprising downlink (DL) resource units for the plurality of HE stations, wherein each resource unit of the resource units comprises a corresponding MCS, a corresponding BW, and a number of Rx SS, wherein the number of Rx SS is less than or equal to a corresponding maximum Rx NSS for the HE-MCS for a corresponding HE station;

encode the trigger frame to further data for each of the plurality of HE stations, wherein the data is encoded in accordance with the DL resource units; and generate signaling for the HE AP to transmit the trigger frame in accordance with the DL resource units.

7. The apparatus of claim 1, wherein the HE AP and the HE STA are each one from the following group: an Institute of Electrical and Electronic Engineers (IEEE) 802.11ax access point, an IEEE 802.11ax station, an IEEE extremely-high throughput (EHT) access point, an IEEE 802.11 EHT station, an IEEE 802.11 station, and an IEEE 802.11 access point.

8. The apparatus of claim 1, further comprising transceiver circuitry coupled to the processing circuitry.

9. The apparatus of claim 1, wherein the BW is one 80 MHz or less, 160 MHz, and 80+80 MHz.

10. The apparatus of claim 1, wherein the OM Notification frame and the OM Control subfield are received from the HE STA.

11. A non-transitory computer-readable storage medium that stores instructions for execution by one or more processors of an apparatus of a high-efficiency (HE) access point (AP), the instructions to configure the one or more processors to:

decode a first physical Layer Convergence Procedure (PLCP) Protocol Data Unit (PPDU), the first PPDU comprising a supported HE-modulation and coding scheme (MCS)(HE-MCS) and number of spatial streams (NSS) set field, the first PPDU received from an HE station, wherein the supported HE-MCS and NSS set field comprises, for a bandwidth (BW), Max HE-MCS for N SS subfields, for each of N=1, ..., 8;

determine, for the HE STA, a maximum receive (Rx) NSS for a MCS and the BW as equal to the smaller of: a maximum value of the N for which a corresponding Max HE-MCS for N SS subfield has a value that indicates support for the HE-MCS, and, of: a maximum supported NSS as indicated by a value of an Rx NSS field of an Operating Mode (OM) Notification frame if a value of an Rx NSS Type subfield indicates 0, or of: a maximum supported NSS as indicated by an Rx NSS subfield of an OM Control subfield;

select a number of Rx SSs for the HE station, wherein the number of Rx SSs is less than or equal to the maximum value of Rx NSS for the MCS and the BW;

encode a second PPDU in accordance with the HE-MCS, the BW, and the selected number of Rx SSs, the second PPDU for the HE STA; and generate signaling to cause the HE AP to transmit the second PPDU to the HE STA in accordance with the HE-MCS, the BW, and the selected number of Rx SSs.

12. The non-transitory computer-readable storage medium of claim 11, wherein the BW is one 80 MHz or less, 160 MHz, and 80+80 MHz.

13. The non-transitory computer-readable storage medium of claim 11, wherein the OM Notification frame and the OM Control subfield are received from the HE STA.

14. An apparatus of a high-efficiency (HE) station, the apparatus comprising: memory; and processing circuitry coupled to the memory, the processing circuitry configured to:

encode a first physical Layer Convergence Procedure (PLCP) Protocol Data Unit (PPDU), the PPDU comprising a supported HE-modulation and coding scheme (MCS)(HE-MCS) and a number of spatial streams (NSS) set field, the PPDU, wherein the supported HE-MCS and NSS set field comprises, for a bandwidth (BW), Max HE-MCS for N SS subfields, for each of N=1, ..., 8;

generate signaling to cause the HE station to transmit the first PPDU to an HE access point (AP);

determine a value of an operation mode (OM) control field, the value indicating a maximum supported NSS by the HE station, wherein a maximum Rx NSS for an HE-MCS and an BW is determined as being equal to the smaller of: a maximum value of the N for which a corresponding Max HE-MCS for N SS subfield has a value that indicates support for the HE-MCS, and, of: a maximum supported NSS as indicated by a value of an Rx NSS field of an Operating Mode (OM) Notification frame if a value of an Rx NSS Type subfield indicates 0, or of: the maximum supported NSS as indicated by an Rx NSS subfield of an OM Control subfield; and generate signaling to cause the HE station to transmit the OMC field to the HE AP, wherein the OMC field is included in a media access control (MAC) portion of a second HE physical Layer Convergence Procedure (PLCP) Protocol Data Unit (PPDU).

15. The apparatus of claim 14, wherein the processing circuitry is further configured to:

decode a third PPDU from the HE AP, the third PPDU including an indication of a resource unit (RU) for the HE station to decode a data portion of the third PPDU, and wherein the RU indicates a BW, a MCSs, and a NSS, wherein the NSS is less than or equal to the maximum Rx NSS for the HE-MCS and the BW.

16. The apparatus of claim 14, further comprising transceiver circuitry coupled to the processing circuitry; and one or more antennas coupled to the transceiver circuitry.

* * * * *